United States Patent
Schimenti et al.

(10) Patent No.: US 10,627,049 B2
(45) Date of Patent: Apr. 21, 2020

(54) WOUND-IN END PROTECTION COMPONENT FOR PRESSURE VESSEL

(71) Applicant: Hexagon Technology AS, Alesund (NO)

(72) Inventors: John Schimenti, Lincoln, NE (US); Brian C. Yeggy, Lincoln, NE (US)

(73) Assignee: HEXAGON TECHNOLOGY AS, Alesund (NO)

( * ) Notice: Subject to any disclaimer, the term of this patent is extended or adjusted under 35 U.S.C. 154(b) by 307 days.

(21) Appl. No.: 15/451,515

(22) Filed: Mar. 7, 2017

(65) Prior Publication Data

US 2017/0254477 A1    Sep. 7, 2017

Related U.S. Application Data

(60) Provisional application No. 62/304,540, filed on Mar. 7, 2016.

(51) Int. Cl.
*F17C 1/06* (2006.01)
*F17C 1/14* (2006.01)
*F17C 13/06* (2006.01)

(52) U.S. Cl.
CPC ............... *F17C 1/06* (2013.01); *F17C 1/14* (2013.01); *F17C 13/06* (2013.01);
(Continued)

(58) Field of Classification Search
CPC ...... F17C 1/06; F17C 1/14; F17C 1/04; F17C 1/005; F17C 13/06; F17C 13/001
(Continued)

(56) References Cited

U.S. PATENT DOCUMENTS

| | | |
|---|---|---|
| 2,479,828 A | 8/1949 | Geckler |
| 2,539,404 A | 1/1951 | Crutchfield |

(Continued)

FOREIGN PATENT DOCUMENTS

| | | |
|---|---|---|
| RU | 99100 U1 | 11/2010 |
| RU | 2507437 C2 | 2/2014 |

(Continued)

OTHER PUBLICATIONS

International Search Report and Written Opinion dated May 22, 2017 for International Application No. PCT/US2017/021046.
(Continued)

*Primary Examiner* — Robert J Hicks
(74) *Attorney, Agent, or Firm* — Mai-Tram D. Lauer; Westman, Champlin & Koehler, P.A.

(57) ABSTRACT

An assembly includes a pressure vessel for containing a fluid, the vessel including a domed end portion having an outer surface; and a component positioned at the domed end portion, wherein the component is attached to the outer surface by a plurality of filament bands wound upon the domed end portion and over at least a part of the component. In another aspect, an apparatus is described for preventing damage to a vessel. The apparatus includes a component configured to be positioned at the domed end portion, wherein the component is configured to be attached to the outer surface by a plurality of filament bands wound upon the domed end portion and over at least a part of the component. A method for attaching a component to a vessel is described that includes positioning the component at the domed end portion and winding a plurality of filament bands.

18 Claims, 31 Drawing Sheets

(52) U.S. Cl.
CPC ............... *F17C 2201/0109* (2013.01); *F17C 2203/0639* (2013.01); *F17C 2203/0663* (2013.01); *F17C 2203/0673* (2013.01); *F17C 2205/0308* (2013.01); *F17C 2209/2118* (2013.01); *F17C 2209/2154* (2013.01); *F17C 2209/22* (2013.01); *F17C 2223/035* (2013.01); *F17C 2223/036* (2013.01); *F17C 2260/01* (2013.01); *F17C 2260/011* (2013.01); *Y02E 60/321* (2013.01)

(58) Field of Classification Search
USPC ............ 220/582, 589, 588, 586, 581, 62.22, 220/62.19, 560.12, 560.04, 729; 206/0.6
See application file for complete search history.

(56) References Cited

U.S. PATENT DOCUMENTS

| | | | |
|---|---|---|---|
| 3,057,509 A * | 10/1962 | Bernd | F17C 1/16 156/169 |
| 3,066,822 A * | 12/1962 | Watter | B29D 24/002 220/581 |
| 3,114,470 A * | 12/1963 | McDill | B63B 3/68 220/560.06 |
| 3,189,500 A | 6/1965 | Escher | |
| 3,368,708 A | 2/1968 | Pflederer | |
| 3,508,677 A * | 4/1970 | Laibson | B29C 53/602 220/590 |
| 3,866,792 A | 2/1975 | Minke | |
| 3,907,149 A * | 9/1975 | Harmon | A62C 13/003 220/590 |
| 4,619,374 A * | 10/1986 | Yavorsky | F17C 1/06 220/62.19 |
| 5,476,189 A | 12/1995 | Duvall | |
| 5,518,141 A | 5/1996 | Newhouse | |
| 5,568,878 A * | 10/1996 | LeBreton | B29C 70/86 220/581 |
| 6,796,453 B2 | 9/2004 | Sanders | |
| 7,731,051 B2 | 6/2010 | Rohwer | |
| 7,971,740 B2 | 7/2011 | Shimada | |
| 8,186,536 B2 * | 5/2012 | Strack | F17C 1/00 220/586 |
| 8,313,595 B2 | 11/2012 | Blanc | |
| 8,397,938 B2 | 3/2013 | Strack | |
| 8,474,647 B2 | 7/2013 | Vinjamuri | |
| 8,523,002 B2 | 9/2013 | Strack | |
| 8,668,108 B2 | 3/2014 | Yeggy | |
| 8,727,174 B2 * | 5/2014 | Otsubo | F17C 13/06 156/188 |
| 2010/0276434 A1 | 11/2010 | Berger | |
| 2011/0220659 A1 | 9/2011 | Strack | |
| 2011/0278316 A1 * | 11/2011 | Herzer | F17C 13/06 220/727 |
| 2013/0299504 A1 * | 11/2013 | Koppert | F17C 1/06 220/586 |
| 2013/0341337 A1 | 12/2013 | Patterson | |
| 2015/0001229 A1 | 1/2015 | Helmig | |

FOREIGN PATENT DOCUMENTS

| | | |
|---|---|---|
| WO | 2010080948 A1 | 7/2010 |
| WO | 2010096517 A1 | 8/2010 |

OTHER PUBLICATIONS

Russian Office Action dated Feb. 17, 2020, for corresponding Russian Patent Application No. 2018135070/06, filed Mar. 7, 2017.

* cited by examiner

WOUND-IN END PROTECTION COMPONENT FOR PRESSURE VESSEL

CROSS REFERENCE TO RELATED APPLICATION

This application claims the benefit of priority of U.S. Provisional Patent Application No. 62/304,540, filed on Mar. 7, 2016, which is hereby incorporated by reference in its entirety.

BACKGROUND

Pressure vessels are commonly used for containing a variety of fluids under pressure, such as hydrogen, oxygen, natural gas, nitrogen, propane, methane and other fuels, for example. Generally, pressure vessels can be of any size or configuration. The vessels can be heavy or light, single-use (e.g., disposable), reusable, subjected to high pressures (greater than 50 psi, for example), low pressures (less than 50 psi, for example), or used for storing fluids at elevated or cryogenic temperatures, for example.

Suitable pressure vessel shell materials include metals, such as steel; or composites, which may be formed of laminated layers of wound fiberglass filaments or other synthetic filaments bonded together by a thermo-setting or thermoplastic resin, for example. Composite construction of the vessels provides numerous advantages such as lightness in weight and resistance to corrosion, fatigue and catastrophic failure. These attributes are due at least in part to the high specific strengths of the reinforcing fibers or filaments that are typically oriented in the direction of the principal forces in the construction of composite pressure vessels.

A liner or bladder is often disposed within a composite pressure vessel shell to serve as a fluid permeation barrier, thereby sealing the vessel. Such a liner is often formed form a non-metallic, resilient material and prevents internal fluids from contacting the composite material.

Pressure vessels are subject to damage during transportation and use due to, for example, collision with other objects or being dropped. The ability of a vessel to retain a fluid at a desired pressure may be compromised by such damage. An existing approach to damage mitigation is to adhere a protective cap to an end of the vessel. However, caps that are merely adhered to the vessel may become dislodged during vessel use. Other approaches include increasing the shell thickness, applying elastomer shell coatings, and adding protective layers or end caps that are fully covered or encapsulated by additional shell material, as described in U.S. Pat. No. 5,476,189, discussed further below, and hereby incorporated by reference. Because the additional coatings or layers generally fully cover a damage-mitigating piece or the entire vessel, these approaches have the disadvantage of significantly increased material usage and manufacturing complexity.

SUMMARY

In one aspect, an assembly includes a pressure vessel for containing a fluid, the vessel including a domed end portion having an outer surface; and a component positioned at the domed end portion, wherein the component is attached to the outer surface by a plurality of filament bands wound upon the domed end portion and over at least a part of the component.

In another aspect, an apparatus is described for preventing damage to a vessel, wherein the vessel includes a domed end portion having an outer surface. The apparatus includes a component configured to be positioned at the domed end portion, wherein the component is configured to be attached to the outer surface by a plurality of filament bands wound upon the domed end portion and over at least a part of the component.

In yet another aspect, a method for attaching a component to a vessel is described. The vessel includes a domed end portion having an outer surface. The method includes positioning the component at the domed end portion; and winding a plurality of filament bands upon the domed end portion and across at least a part of the component to attach the component to the domed end portion.

This disclosure, in its various combinations, either in apparatus or method form, may also be characterized by the following listing of items:

1. An assembly including:
    a pressure vessel for containing a fluid, the vessel including a domed end portion having an outer surface; and
    a component positioned at the domed end portion, wherein the component is attached to the outer surface by a plurality of filament bands wound upon the domed end portion and over at least a part of the component.
2. The assembly of item 1, wherein the component includes an attachment feature.
3. The assembly of item 2 wherein the assembly further includes a protective cap, and wherein the protective cap is coupled to the component via the attachment feature.
4. The assembly of item 3, wherein the attachment feature includes a snap-fit joint, the assembly further including:
    an insert coupled to a vessel-facing surface of the protective cap, wherein the insert is configured to couple to the snap-fit joint.
5. The assembly of any of items 1-4, wherein the component includes:
    a plurality of raised portions; and
    a low portion between two adjacent raised portions, wherein at least one of the plurality of filament bands is wound upon the low portion.
6. The assembly of any of items 1-5 wherein the component is annular.
7. The assembly of any of items 1-6, wherein the component includes a plurality radially extending tabs, and wherein at least one of the plurality of filament bands is wound upon at least one of the plurality of tabs.
8. An apparatus for preventing damage to a vessel, the vessel including a domed end portion having an outer surface, the apparatus including:
    a component configured to be positioned at the domed end portion, wherein the component is configured to be attached to the outer surface by a plurality of filament bands wound upon the domed end portion and over at least a part of the component.
9. The apparatus of item 8, and wherein the component includes an attachment feature.
10. The apparatus of item 9, further including a protective cap, and wherein the protective cap is configured to be coupled to the component via the attachment feature.
11. The apparatus of item 10, wherein the attachment feature includes a snap-fit joint, and the apparatus further includes:
    an insert configured to be coupled to a vessel-facing surface of the protective cap, wherein the insert is configured to couple to the snap-fit joint.
12. The apparatus of any of items 8-11, wherein the component includes a plurality radially extending tabs.
13. The apparatus of any of items 8-12, wherein the component includes:

a plurality of raised portions; and
a low portion between two adjacent raised portions.

14. The apparatus of item 13, wherein at least one of the plurality of raised portions is shaped as a pyramidal trapezoid.

15. The apparatus of any of items 8-14, wherein the component is annular.

16. The apparatus of any of items 8-15, wherein the component includes:
    an annular shape;
    a plurality of raised portions; and
    a plurality of low portions, wherein the plurality of raised portions and the plurality of low portions are arranged in an alternating pattern.

17. A method for attaching a component to a vessel, the vessel including a domed end portion having an outer surface, the method including:
    positioning the component at the domed end portion; and
    winding a plurality of filament bands upon the domed end portion and across at least a part of the component to attach the component to the domed end portion.

18. The method of item 17, wherein the component includes a plurality of raised portions and a low portion between two adjacent raised portions, wherein winding the plurality of filament bands includes winding at least one of the plurality of filament bands upon the low portion.

19. The method of any of items 17-18, wherein the component includes a plurality of radially extending tabs, wherein winding the plurality of filament bands includes winding at least one of the plurality of filament bands upon at least one of the plurality of tabs.

20. The method of any of items 17-19, wherein the component includes an attachment feature, the method further including:
    coupling a protective cap to the component at the attachment feature.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth several embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

This disclosure recognizes that it is desirable to protect a pressure vessel against damage in a reliable and low-cost manner. It is of particular interest to protect the ends of the pressure vessel, as they may be most susceptible to damage due to their placement and generally hemispheroidal shape. In illustrative embodiments, an end component is secured to an end portion of a vessel by filaments wrapped about the end portion of the vessel and over portions of the end component. The end component may be secured to the vessel at the time of vessel manufacture or may be retrofit to an existing pressure vessel at a later time. An exemplary disclosed end component may incorporate suitable protective characteristics, and/or may be configured to couple with an attachment such as a protective end cap. In an exemplary embodiment, an end component is not fully covered or encased by the filament wrapping; thus, the disclosed concept uses less filament and resin than some prior protective systems in which a protective component or the entire vessel is covered with layers of composite material. Moreover, attachment of an end component by cured wound filaments is more secure than adhesive bonding of a protective cap onto the end portion of the vessel.

Figure 1A:
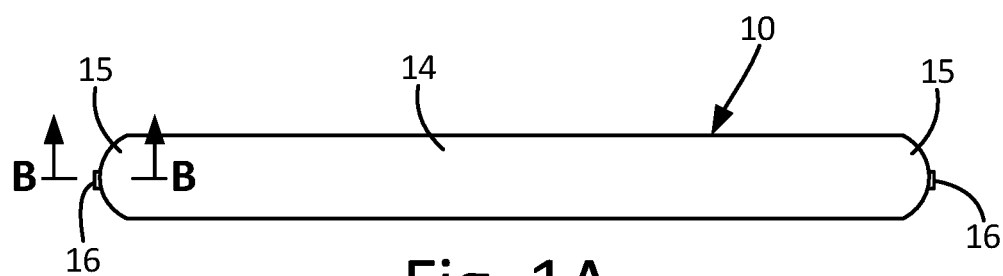
FIG. 1A shows a side view of a typical pressure vessel.
Figure 1B:
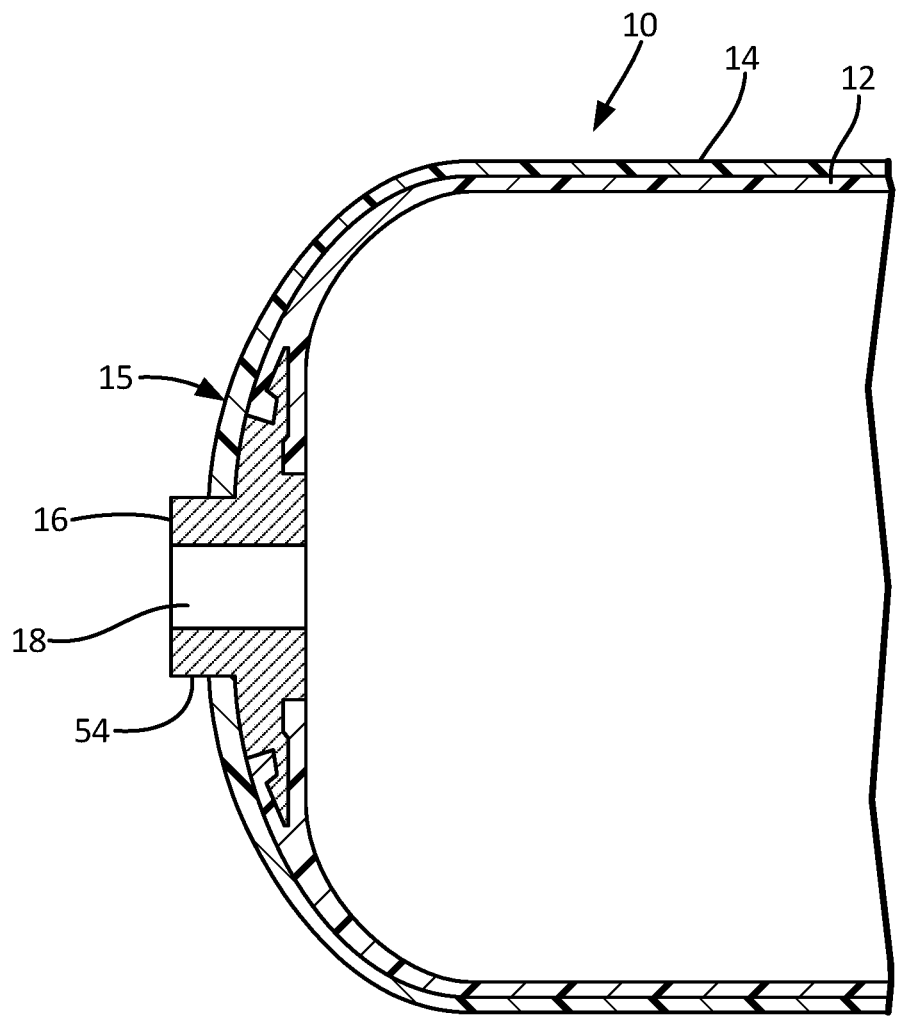
FIG. 1B shows a vertical cross-sectional view of an end portion of the typical pressure vessel, taken at line B-B of FIG. 1.

FIGS. 1A and 1B illustrate an elongated pressure vessel 10, such as that disclosed in U.S. Pat. No. 5,476,189, entitled "Pressure vessel with damage mitigating system," which is hereby incorporated by reference. Such a conventional pressure vessel or tank 10 is typically used for storing pressurized fluids. Vessel 10 has a substantially cylindrical main body section with domed end portions 15. A boss 16 is provided at one or both ends of the vessel 10 to provide a port for communicating with the interior of the vessel 10. Vessel 10 is formed with an interior fluid impermeable liner 12 covered by an outer composite shell 14.

End portion 15 may have a hemispherical or domed shape, and may include a boss 16 with a bore 18 therethrough that allows fluid to be introduced into or removed from vessel 10. Liner 12 may be made of, for example, plastic or elastomer materials. Shell 14 may be a composite material fabricated of fibers or filaments contained in a resin, the fibers being of, for example, carbon, graphite, or aramid. In this case, "composite" means a fiber reinforced resin matrix material, such as a filament wound or laminated structure. The composite shell 14 resolves structural loads on the vessel 10. Details relevant to the formation of an exemplary pressure vessel 10 are disclosed in U.S. Pat. No. 4,838,971, entitled "Filament Winding Process and Apparatus," which is incorporated herein by reference. Boss 16 may be formed of a metal, such as for example, aluminum, brass, steel, or nickel alloy, or any suitable metal or non-metal material. Details of an exemplary boss are disclosed in U.S. Pat. No. 5,429,845, titled "Boss for a Filament Wound Pressure Vessel," which is incorporated herein by reference.

Figure 2:
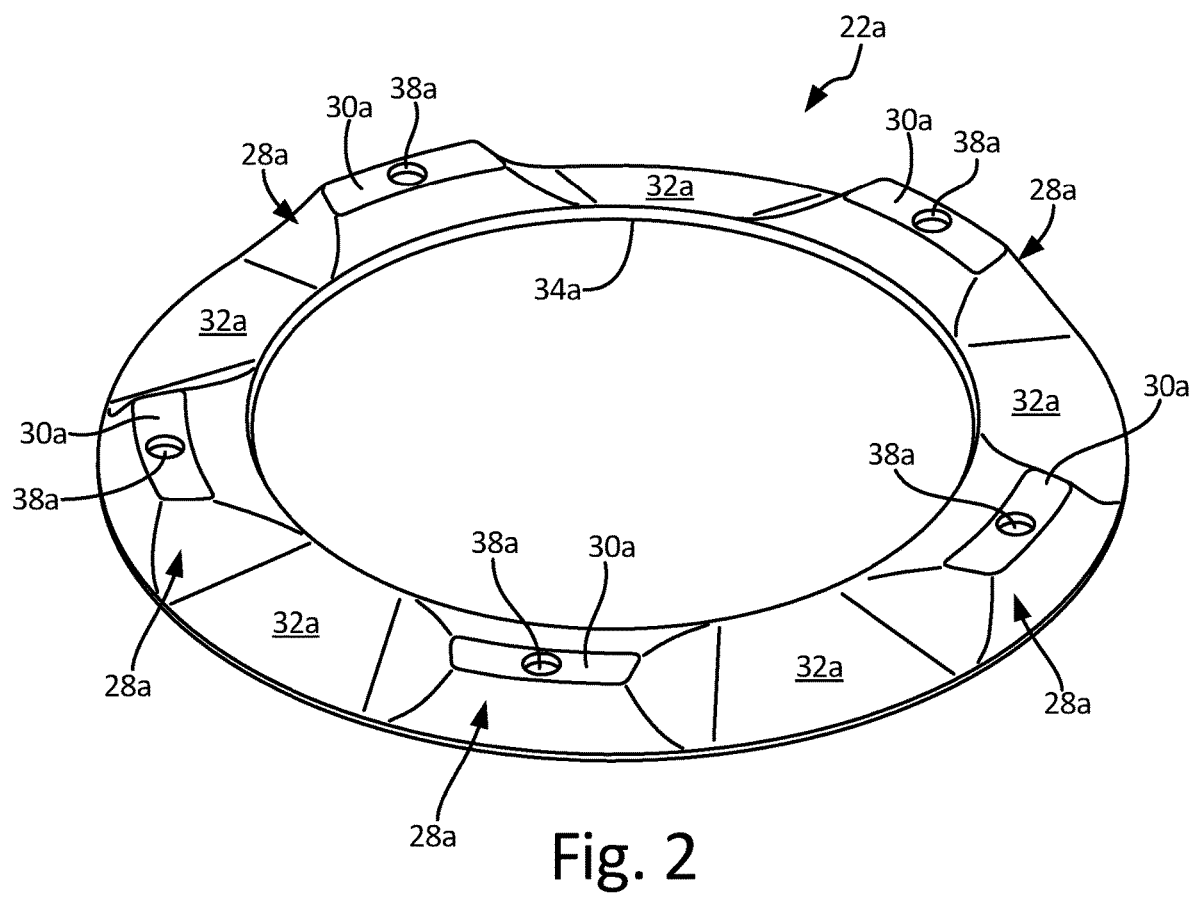
FIG. 2 shows a perspective view of a first illustrative embodiment of an end component of the present disclosure.

FIG. 2 shows a first illustrative embodiment of an end component 22a of the present disclosure configured to be secured to a vessel 10. In an illustrative embodiment, end component 22a has an annular shape with central opening 34a and includes a plurality of spaced-apart raised portions 28a and a plurality of flat areas or low portions 32a between two adjacent raised portions 28a. Thus, in the illustrated embodiment, raised portions 28a and low portions 32a are arranged about end component 22a in an alternating pattern. Central opening 34a is shown as being circular, but may be an opening or aperture of any suitable shape. Flat areas or low portions 32a are shown as being substantially planar, but may have any suitable shape or profile that is recessed compared to raised portions 28a. Moreover, in exemplary embodiments, flat areas or low portions 32a are not truly flat or planar, but rather are slightly contoured to match the convex shape of the outer surface of domed end portion 15 of pressure vessel 10. Raised portions 28a include attachment features 38a configured to couple with corresponding features 72 on an attachment, such as a protective cap 40 (see FIGS. 7A-7C). In an illustrative embodiment, attachment features 38a are holes configured to align with fasteners on, or configured for attachment to or through, protective cap 40 such as screws, rivets, push-in fasteners, hooks, snap-in tabs, or clips, for example (see FIGS. 19-27). Alternatively, attachment features 38a may be screws, rivets, push-in fasteners, hooks, snap-in joints, clips, or the like, configured to mate with complementary features on protective cap 40.

In an illustrative embodiment, end component 22a has a circular, annular shape and includes low portions 32a and raised portions 28a, each having similar lengths about the circumference of end component 22a. However, it is contemplated that end component 22a, and its raised portions 28a and flat or low portions 32a may have any shape and surface configuration that allows attachment to vessel 10 using a plurality of filament bands 44 as described below. In an exemplary embodiment, each raised portion is configured substantially as a pyramidal trapezoid, but other shapes are also possible, as long as raised portions 28a are elevated with respect to low portions 32a and have a top surface 30a with or without attachment feature 38a. In an exemplary embodiment, end component 22a is constructed of a solid polymer formed by injection molding or vacuum forming, but end component 22a may be formed of any useful material and by any suitable process.

Figure 3:
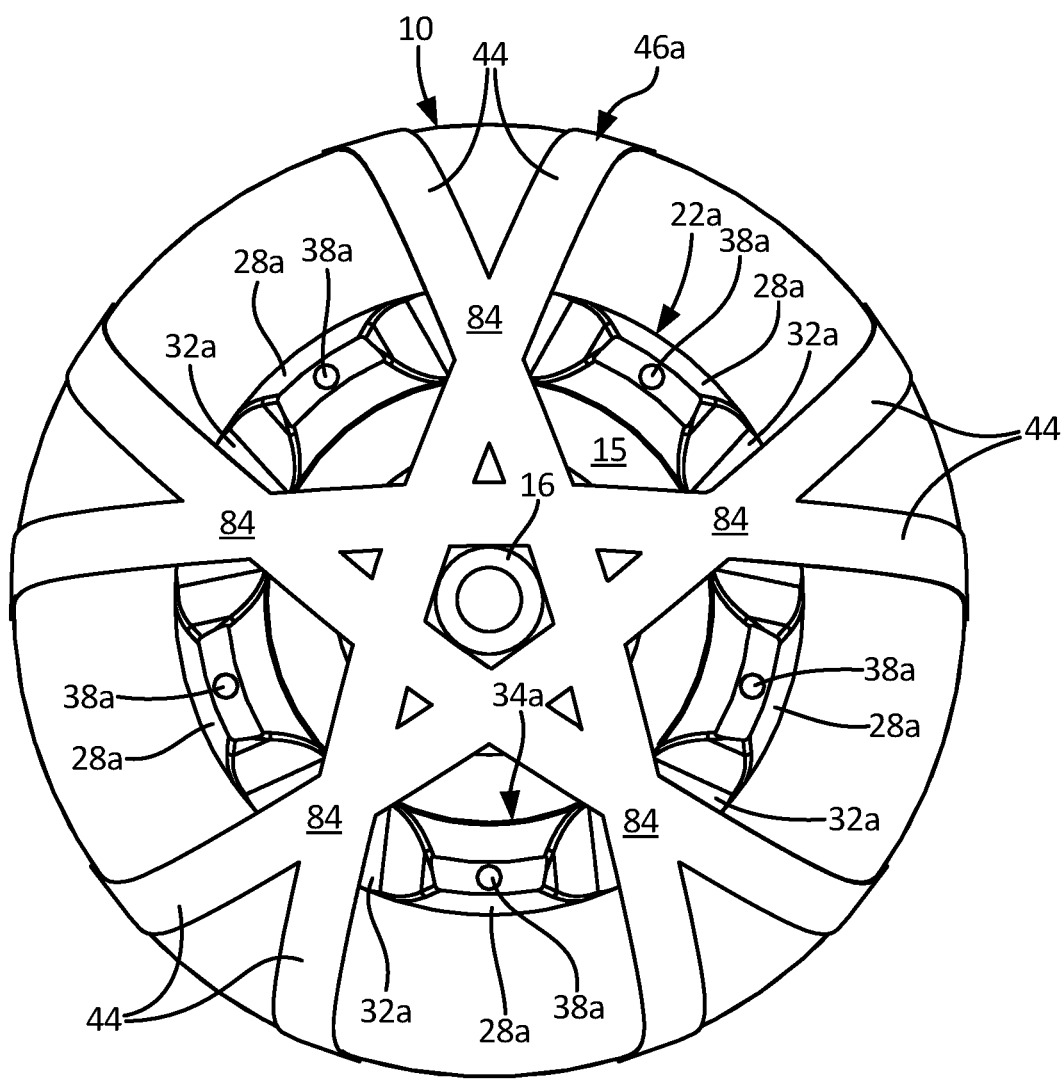
FIG. 3 shows an end view of the end component of FIG. 2 attached to an end portion of a pressure vessel by wrapped filaments.
Figure 4:
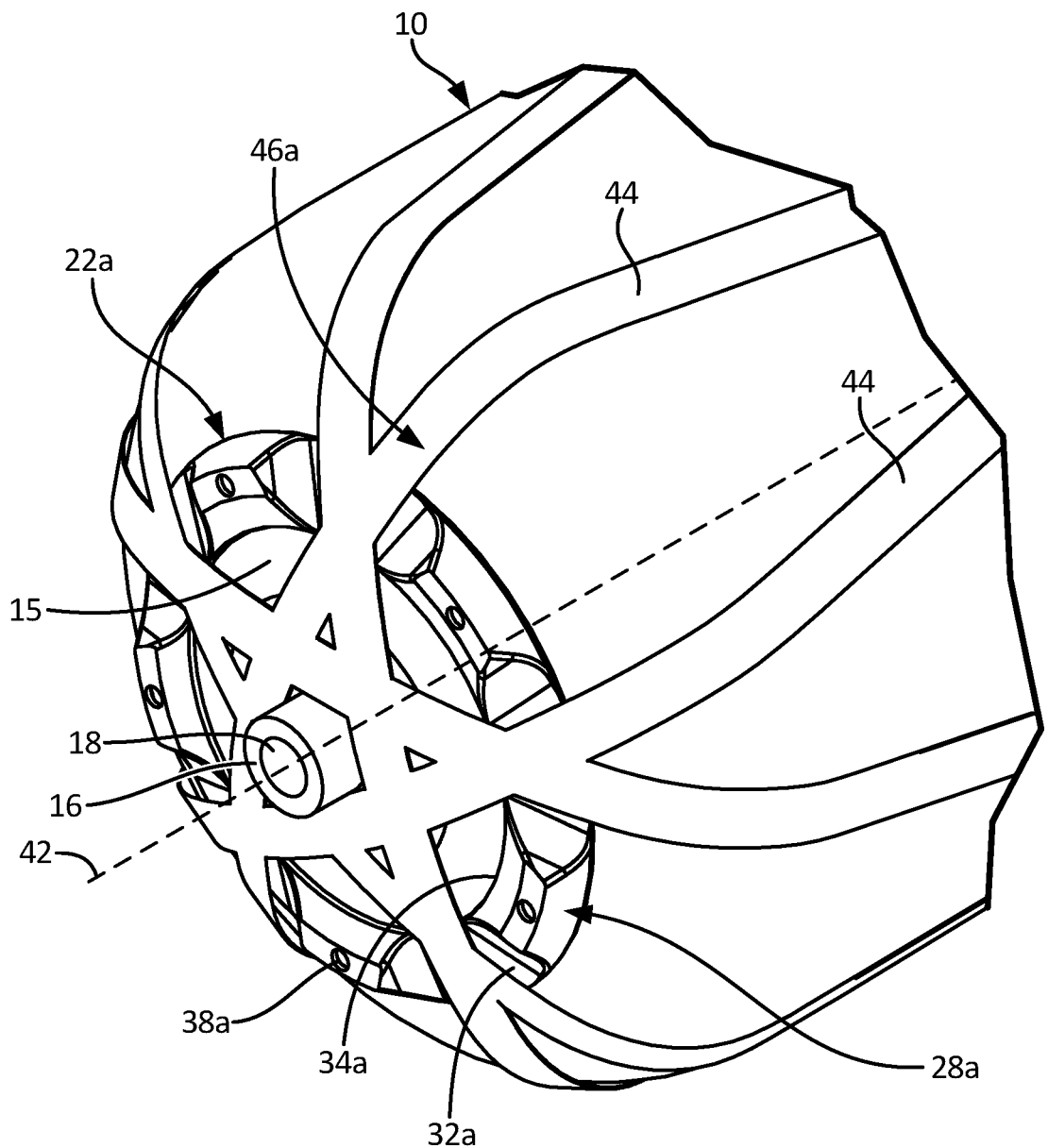
FIG. 4 shows a perspective view of the end component of FIG. 2 attached to an end portion of a pressure vessel by wrapped filaments.

FIGS. 3 and 4 show an illustrative embodiment of end component 22a disposed to abut an end portion 15 of vessel 10 such that a boss 16 of vessel 10 is inserted through central opening 34a. Component 22a is attached to the outer surface of end portion 15 by a plurality of filament bands 44 wound upon the domed end portion 15 and over at least a part of the component 22a. In an exemplary embodiment, end component 22a has a vessel-facing surface that is contoured to follow the curvature of end portion 15 such that end component 22a is positioned substantially flush against the convex outer surface of end portion 15.

End component 22a is secured to vessel 10 by a plurality of filament bands 44. In an exemplary embodiment, filament bands 44 may be of a fibrous reinforcing material such as fiberglass, carbon, or aramid fiber, for example, and may be formed using the same materials and process as shell 14. Filament bands 44 extend along shell 14 of vessel 10 and over end component 22a such that each of the plurality of bands 44 passes over one of the plurality of low portions 32a, extends past (and at some points adjacent to) boss 16, and passes over another of the plurality of low portions 32a. The plurality of filament bands 44 are positioned so that at least one of the filament bands 44 passes over and is wound upon each pair of non-adjacent low portions 32a, thereby forming a web 46 of filament bands 44 arranged about end portion 15 of vessel 10. The pattern formed by web 46 depends on the number and placement of filament bands 44 and the shape and configuration of end component 22a. To form filament web 46, filament bands 44 overlie, intersect, or otherwise come together. In an exemplary embodiment, filament web 46 is formed by materials and processes such as described in U.S. Pat. No. 4,838,971, which is incorporated by reference. Thus, each filament band 44 of filament web 46 is formed from many filaments built upon each other in a winding process.

It is contemplated that filament bands 44 may pass over some or all of low portions 32a, depending on the configuration of end component 22a. In an exemplary embodiment, filament bands 44 extend beyond end portion 15 and for some distance along the cylindrical body of pressure vessel 10. Filament bands 44 in an exemplary embodiment follow a hoop and/or helical winding pattern. Filament bands 44 may be bonded to each other and to vessel 10 by a heat-curable resin such as epoxy, polyester, vinylester, or any other suitable material capable of providing the properties required for the application in which the vessel 10 is to be used. End component 22a is thereby secured between web 46 and end portion 15 of vessel 10. By passing filament bands 44 over low portions 32a disposed between raised portions 28a, raised portions 28a act as stops to help prevent rotation of end component 22a about an axis 42 that runs longitudinally through bore 18 and the body of pressure vessel 10, for use in attachment methods further discussed below.

The use of a plurality of filament bands 44 to secure end component 22 to vessel 10 requires less filament than if the entire vessel 10, or even just the entire end portion 15, were covered in a layer of filament windings. While particular patterns of web 46 are illustrated, it is contemplated that other patterns of filament bands 44 may be used to secure end component 22 to pressure vessel 10. In embodiments of end component 22 in which attachment features 38 are provided, it is preferable that the web 46 leave at least some of the attachment features 38 exposed.

Figure 5:
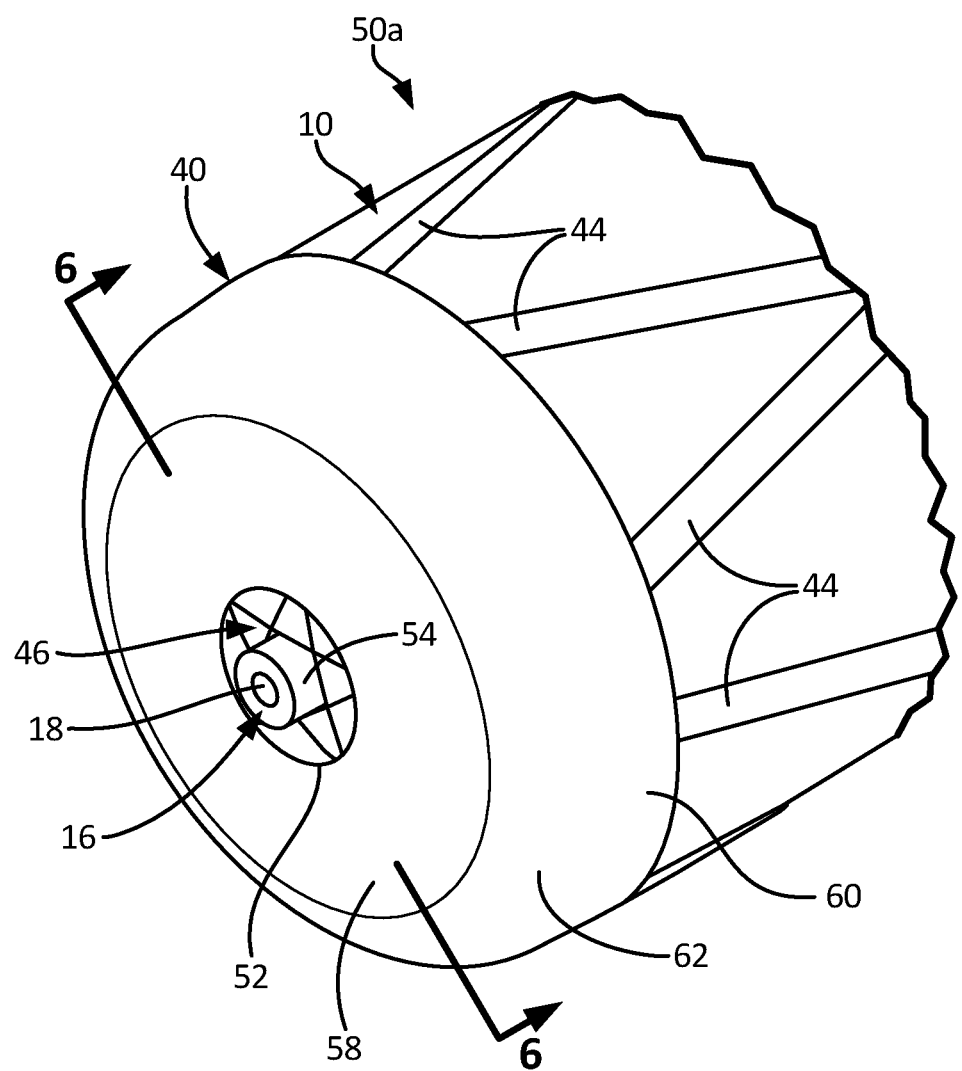
FIG. 5 is a perspective view of a first illustrative embodiment of an assembly including a protective end cap of the present disclosure mounted on a pressure vessel via the end component of FIG. 2.
Figure 6:
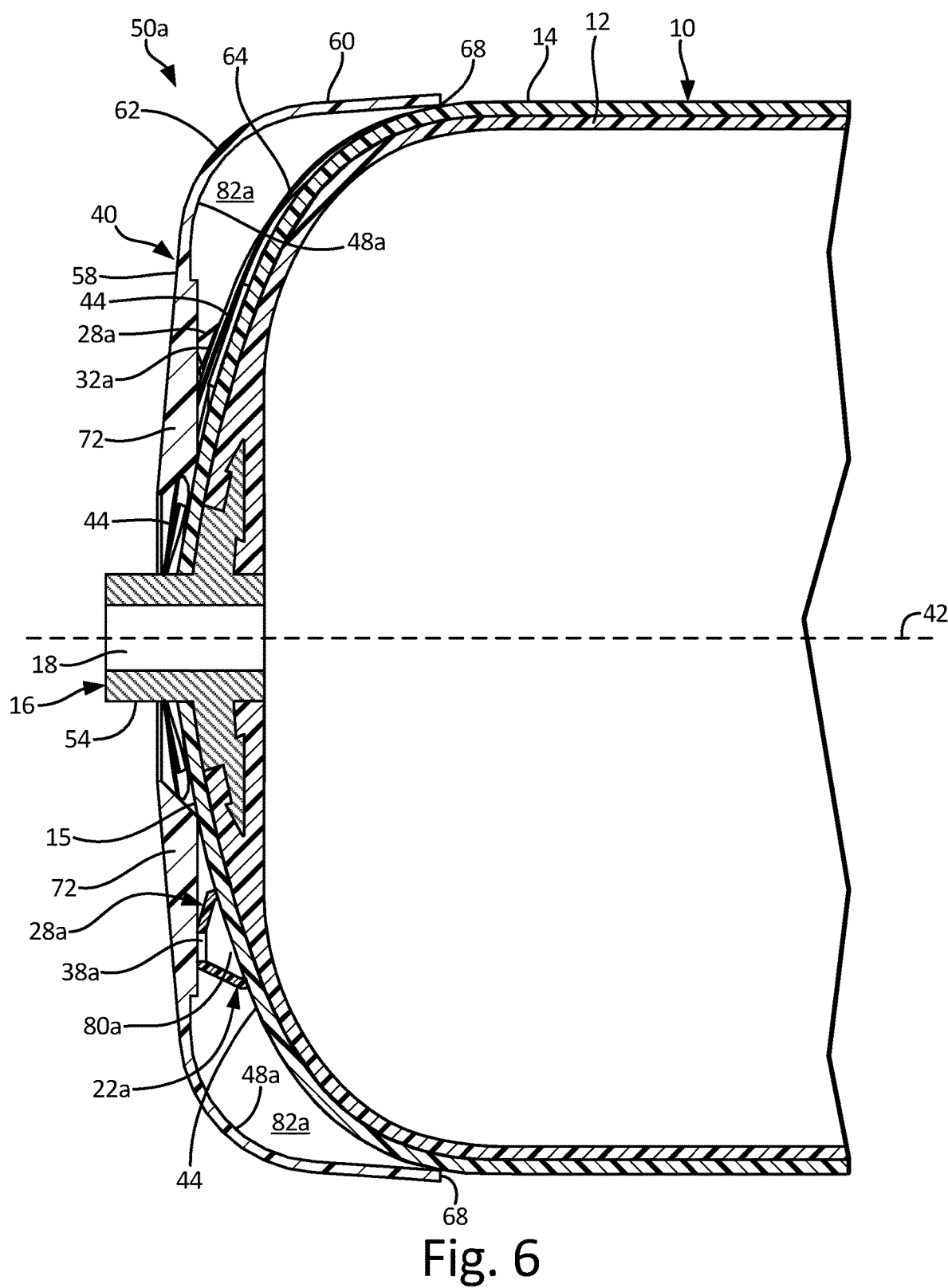
FIG. 6 is a partial cross-sectional view of the assembly of FIG. 5, taken along line 6-6 of FIG. 5.

In an exemplary embodiment, end component 22a allows an attachment to be mounted to vessel 10 and/or allows vessel 10 to be mounted to another structure. In an illustrative assembly 50a of FIGS. 5 and 6, the mounted attachment is a protective cap 40. FIGS. 5 and 6 show a first embodiment of an assembly 50a including protective cap 40 mounted on an end portion 15 of vessel 10 using end component 22a. FIG. 6 is a cross-sectional view taken through line 6-6 of FIG. 5. End component 22a is positioned to abut end portion 15 such that boss 16 is inserted through central opening 34a. Filament bands 44 extend across end component 22a, attaching end component 22a to vessel 10 and forming web 46a. Protective cap 40 is mounted to end component 22a by coupling attachment features 72 on cap 40 (visible in FIGS. 7A-7C) with attachment features 38a on end component 22a. Additional details of such attachment are explained below with reference to another embodiment of FIGS. 16-27, for example. End wall 58 of protective cap 40 in the vicinity of hole 52 is positioned to abut web 46, and rim 68 is positioned adjacent to and extending about the circumference of shell 14 of vessel 10.

FIG. 5 shows protective cap 40 mounted to vessel 10 via end component 22, which is obscured by protective cap 40 in this figure. Protective cap 40 is configured to fit over end portion 15 of vessel 10, and includes an end wall 58 that abuts end component 22a at end portion 15 of vessel 10, as shown in FIG. 6. A side wall 60 of protective cap 40 extends along vessel 10; a rounded radius wall 62 extends between side wall 60 and end wall 58. Radius wall 62 is configured to protect an underlying radius surface 64 of vessel 10. While a line of demarcation is visible in FIG. 5 between end wall 58 and radius wall 62, it is contemplated that in an exemplary embodiment, these wall portions flow smoothly into each other without clear demarcations. In an exemplary embodiment, protective cap 40 includes a hole 52 configured to concentrically align with boss 16 and permit passage of the neck 54 of boss 16.

Figure 7:
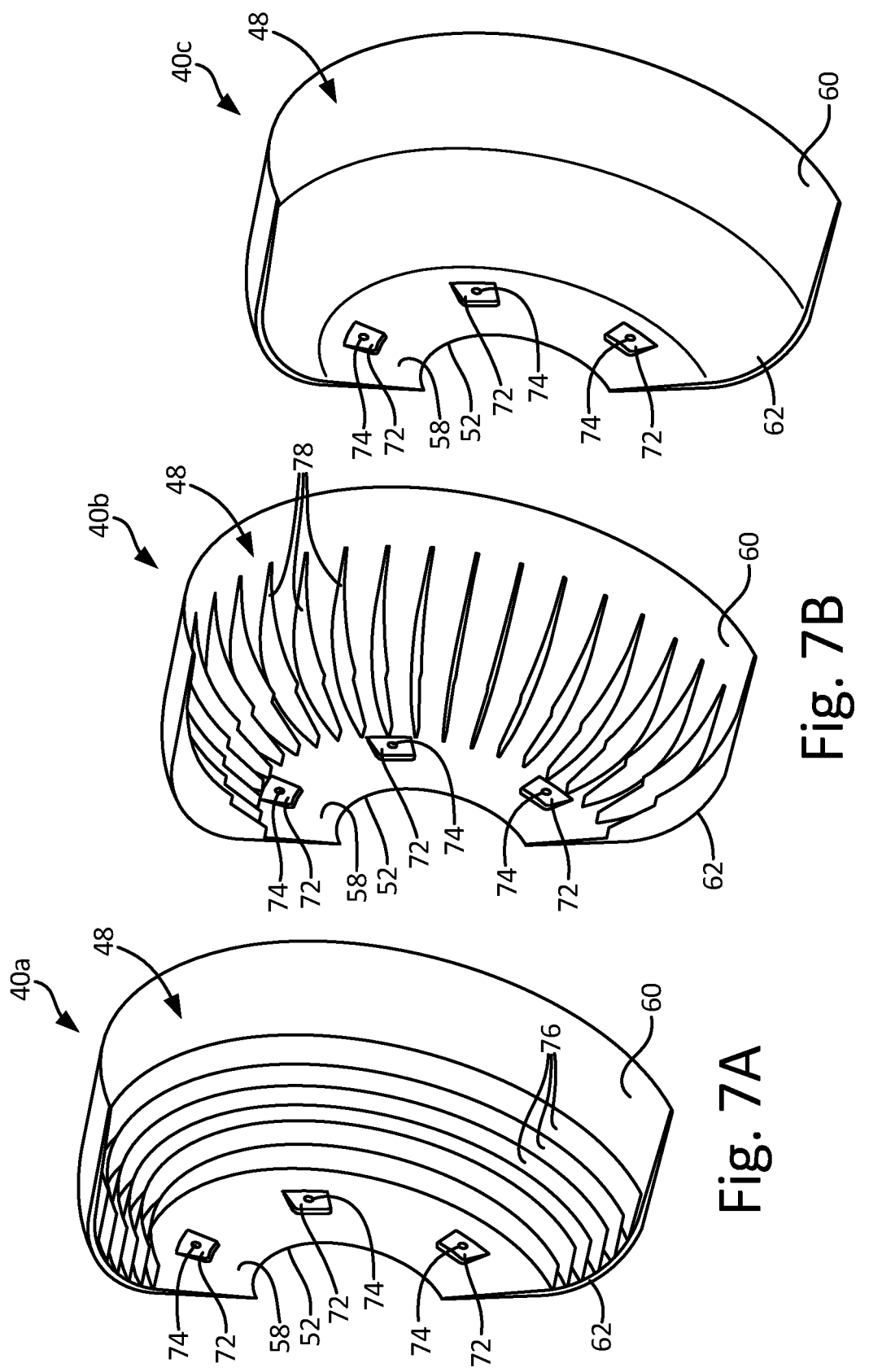
FIG. 7A shows a cross-sectional view (such as would be taken along line 6-6 of FIG. 5) of another exemplary protective end cap of the present disclosure with a vessel-facing surface including circumferential ridges.
FIG. 7B shows a cross-sectional view (such as would be taken along line 6-6 of FIG. 5) of yet another exemplary protective end cap of the present disclosure with a vessel-facing surface including radial ridges.
FIG. 7C shows a cross-sectional view (such as would be taken along line 6-6 of FIG. 5) of still another exemplary protective end cap of the present disclosure including a vessel-facing surface without ridge features.

FIGS. 7A-7C show illustrative embodiments of the vessel-facing surface 48 of protective caps 40a, 40b and 40c. In some embodiments, protective cap 40 has a wall thickness that is greatest at radius wall 62, decreases along end wall 58 toward hole 52, and decreases along side wall 60 toward rim 68. Attachment features 72 on the vessel-facing surface 48 of protective cap 40 align with, and correspond to, attachment features 38 on end component 22 to allow protective cap 40 to be coupled to end component 22, and thus to vessel 10. In an illustrative embodiment, attachment features 72 are configured as protrusions on vessel-facing surface 48 of end wall 58. In the illustrated embodiments, an attachment feature 72 includes a hole 74 configured to accept a fastener, such as a screw, bolt, or push-in fastener (see fastener 56 in FIG. 19). Attachment features 72 are shown to have a shape complementary to raised portions 28 of end component 22, but it is understood that attachment features on protective cap 40 may have any shape, aperture(s), bore(s) and/or configuration useful for coupling to an end component 22.

The illustrative embodiment of protective cap 40*a* shown in FIG. 7A includes an arrangement of circumferential ridges 76 positioned concentrically about hole 52, the arrangement having a shape to abut radius surface 64 of end portion 15 of pressure vessel 10. Another illustrative embodiment of protective cap 40*b*, shown in FIG. 7B, includes an arrangement of ridges 78 positioned radially about hole 52, each extending from end wall 58 to side wall 60. The arrangement of ridges 78 has a shape to abut radius surface 64 of end portion 15 of pressure vessel 10. Ridges 76, 78 provide structural support to protective cap 40*a*, 40*b*, making the protective cap 40*a*, 40*b* better able to withstand impact without deformation or damage to vessel 10. Any number, thickness, spacing, and configuration of ridges, ribs, and other structural features may be used, and may depend on, for example, the material used for the end cap, the size of the end cap, the shape of end portion 15 of pressure vessel 10, and the application. The illustrative embodiment of protective cap 40*c* shown in FIG. 7C includes a vessel-facing surface 48 without ridges.

It is contemplated that protective cap 40 may be formed of any material and in any shape suitable for mitigating damage to vessel 10. Protective cap 40 may be formed of a solid polymer, a foamed polymer, and/or a metal. For example, protective cap 40 may be completely constructed of a solid polymer, may be a solid polymer shell filled with a foamed polymer, or may be constructed of a foamed polymer with or without a protective coating. Protective cap 40 may be formed by injection molding or vacuum forming, or by any useful process depending, for example, on the material and shape of protective cap 40.

As shown in FIG. 6, an exemplary raised portion 28*a* has a somewhat trapezoidal profile, relative to shell 14, but may have any suitable cross-sectional profile. An interior space 80*a* defined between raised portion 28*a* and end portion 15 and may have any size or shape suitable for mounting protective cap 40 to end portion 15 at attachment features 38*a*, and may depend on, for example, the fasteners (not shown) used to mount protective cap 40 to vessel 10 and/or the shape of protective cap 40. An interior space 82*a* defined by radius wall 62 of protective cap 40 and radius surface 64 of vessel 10 is provided to allow space into which protective cap 40 may be crushed or deformed without damaging shell 14 and/or vessel 10. The shape and/or size of interior space 82*a* may depend on, for example, the materials used or application desired for protective cap 40. Moreover, foam or other damage mitigating materials may be provided in interior space 82*a*.

It is contemplated that an illustrative embodiment of protective cap 40 may be removable from end component 22*a* to allow replacement if damaged, or to meet the needs of a given application. For example, different embodiments of protective cap 40 may have different physical profiles, different levels of resistance to scraping, impact damage, or crushing, and/or may be configured to visually indicate the occurrence of impact, scrape, or other damage. It is contemplated that an illustrative embodiment of end component 22*a* and/or protective cap 40 may be added to an existing vessel. It is contemplated that attachments other than disclosed protective cap 40 may be coupled to vessel 10 via end component 22*a*.

Figure 8:
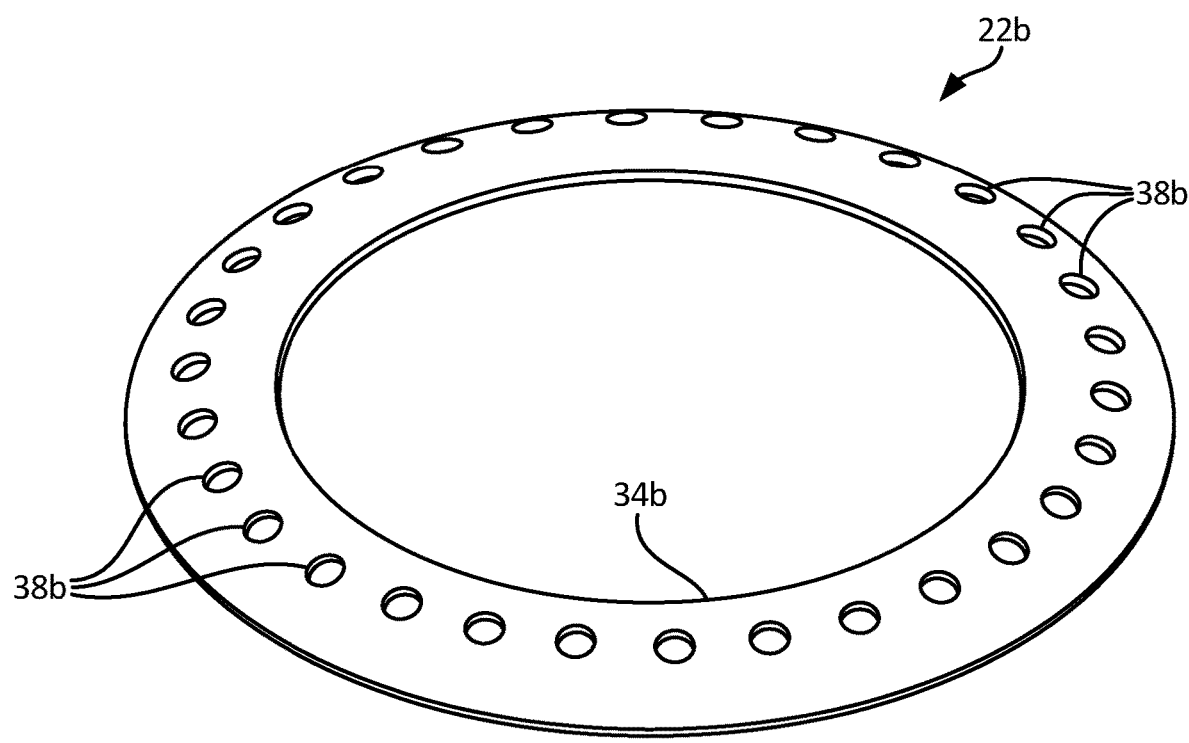
FIG. 8 shows a perspective view of a second illustrative embodiment of an end component of the present disclosure.

A second illustrative embodiment of end component 22*b*, shown in FIG. 8, has the annular shape of a ring having central opening 34*b*. End component 22*b* may have a cross-sectional profile substantially in the shape of a "U" (see FIG. 11). A plurality of spaced-apart attachment features 38*b* are disposed about end component 22*b*. Attachment features 38*b* are configured to couple with corresponding features 72 on a protective cap 40 as previously described herein. An illustrative embodiment of end component 22*b* has a uniform cross-sectional profile and attachment features 38*b* that are closely-spaced about the entire circumference of end component 22*b*. Thus, the plurality of filament bands 44 may pass over any locations (rather than defined flat portions) on end component 22*b* while leaving a portion of the plurality of attachment features 38*b* exposed for mounting protective cap 40 to vessel 10. Thus, end component 22*b* may be secured to vessel 10 with any rotational orientation about longitudinal axis 42 (see FIG. 11). End component 22*b* and central opening 34*b* are shown as being circular but may be of any suitable shape.

Figure 9:
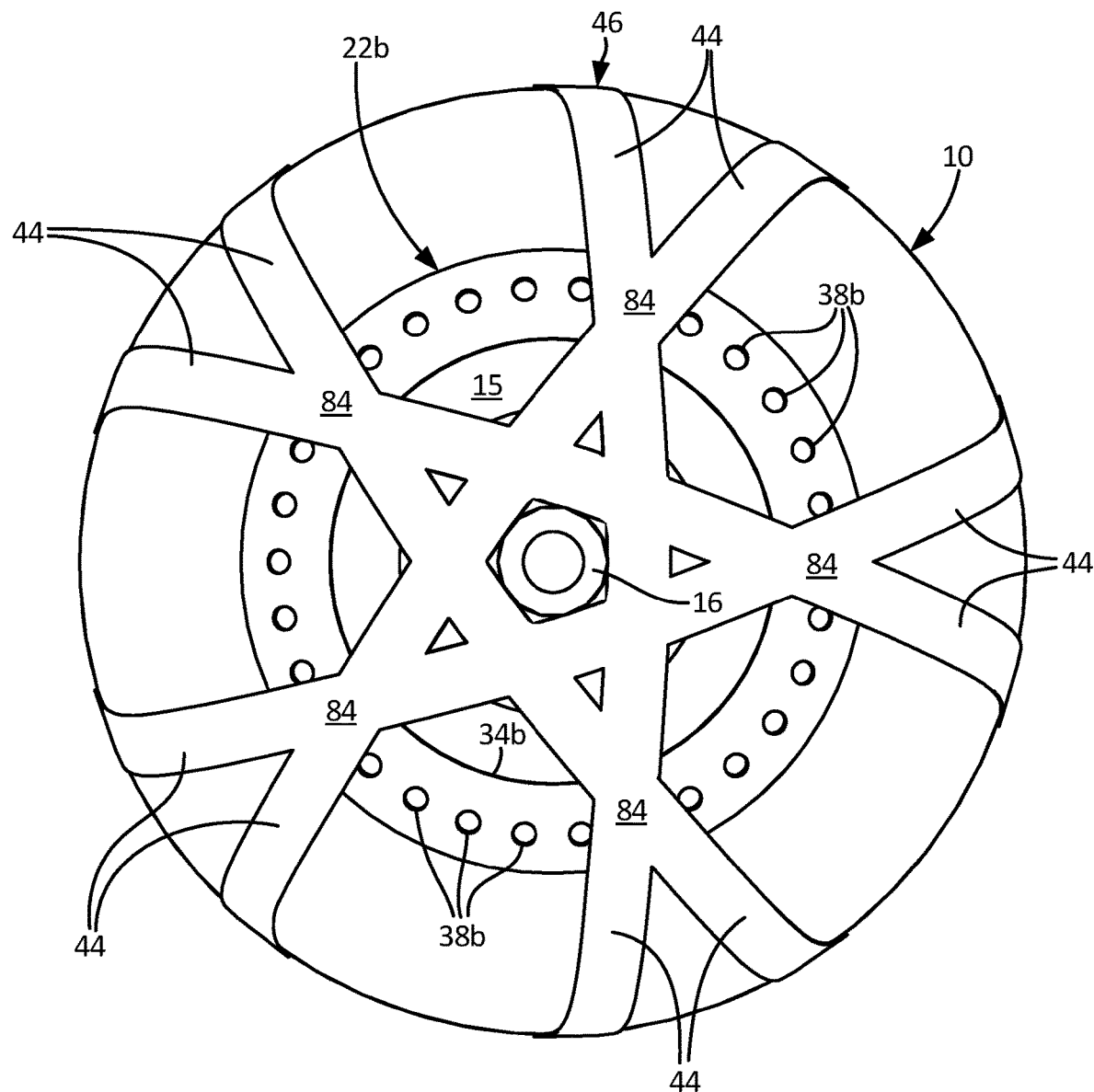
FIG. 9 shows an end view of the end component of FIG. 8 attached to an end portion of a pressure vessel by wrapped filaments.
Figure 10:
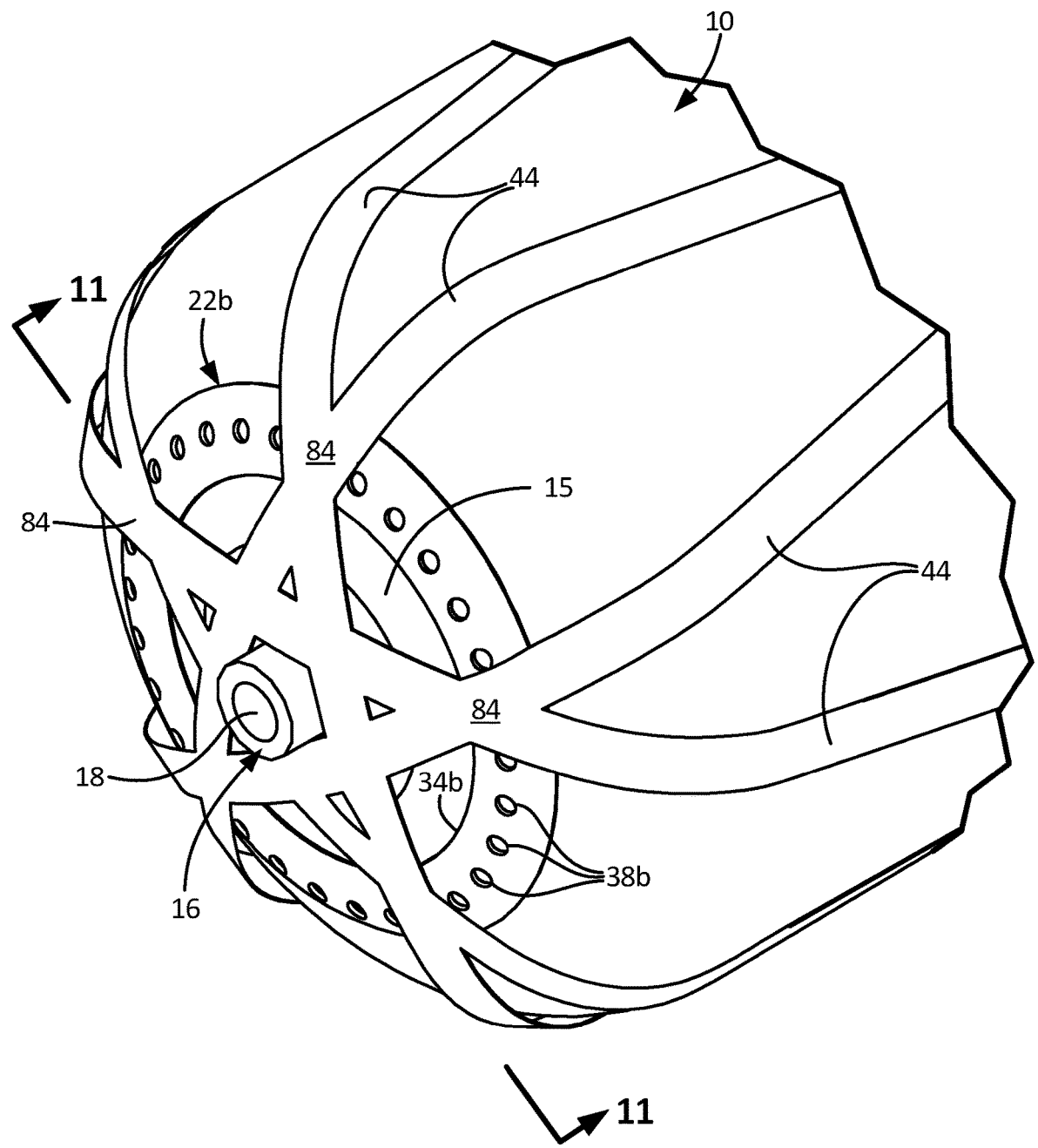
FIG. 10 shows a perspective view of the end component of FIG. 8 attached to an end portion of a pressure vessel by wrapped filaments.

FIGS. 9 and 10 show an illustrative embodiment of an assembly of end component 22*b* disposed to abut end portion 15 of vessel 10 such that boss 16 is inserted through central opening 34*b*. End component 22*b* may have vessel-facing surfaces that are contoured to follow the curvature of shell 15 such that end component 22*b* is positioned substantially flush against end portion 15. End component 22*b* is secured to vessel 10 by a plurality of filament bands 44. In an illustrative embodiment, each of the plurality of filament bands 44 passes over end component 22*b* at a location 84, extends past and adjacent to boss 16, and passes over end component 22*b* at a second location 84. The plurality of filament bands 44 are arranged so that each of the filament bands 44 passes over of a different pair of spaced-apart locations 84 on end component 22*b*, thereby forming a web 46*b* of filament bands 44 about end portion 15 of vessel 10. The pattern formed by web 46*b* depends on the number and placement of filament bands 44 and the configuration of end component 22*b*. In some drawing figures, it may appear that the filament web 46 is spaced from the pressure vessel 10. However, it is to be understood that filament bands 44 are bonded to each other and to vessel 10 by a heat-curable resin. End component 22*b* is thereby secured between web 46*b* and end portion 15 of vessel 10.

Figure 11:
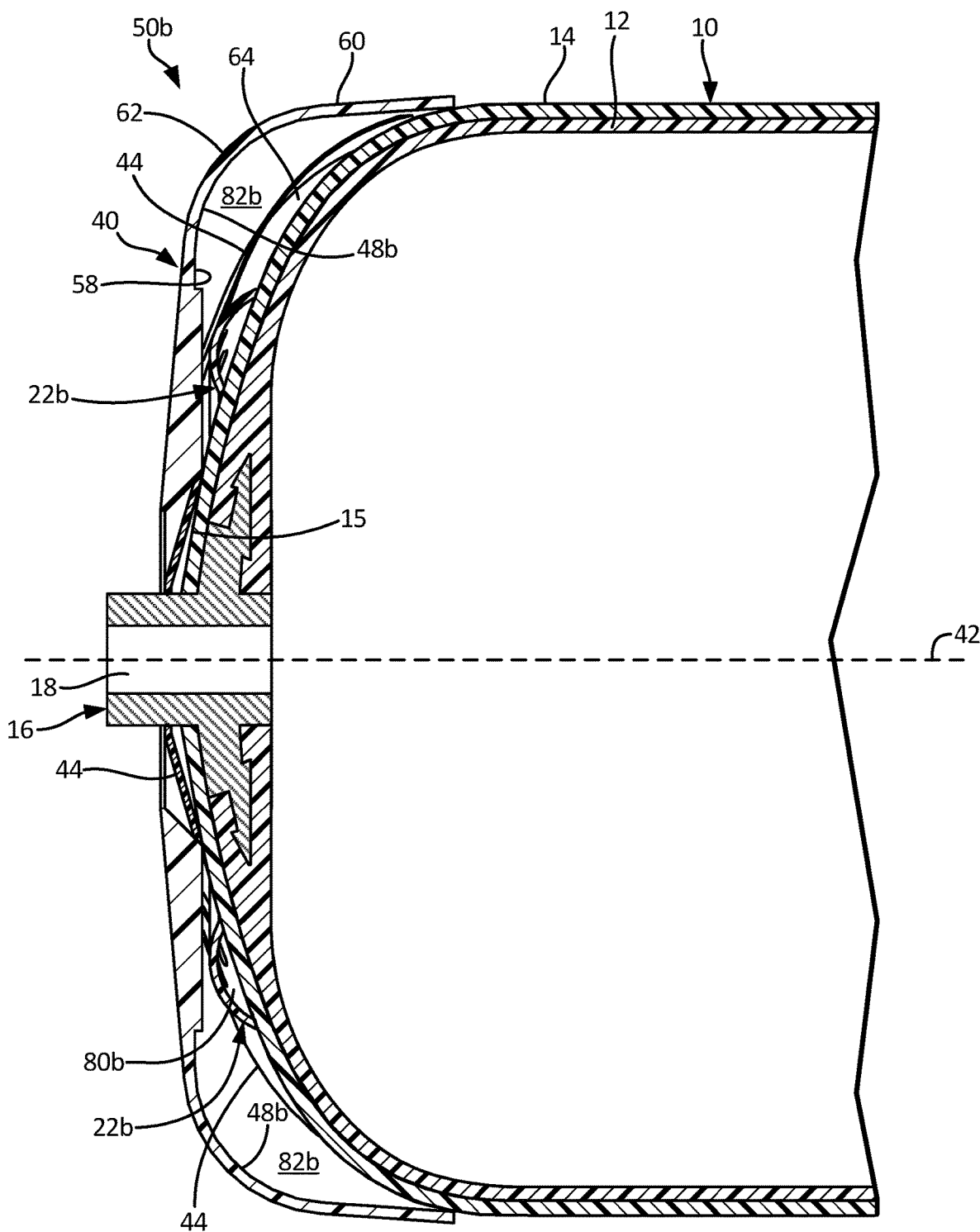
FIG. 11 is a partial cross-sectional view of a second illustrative embodiment of an assembly including a protective end cap mounted on a pressure vessel via the end component of FIG. 8. The view in FIG. 11 is taken at line 11-11 of FIG. 10; however, FIG. 11 further adds the protective end cap.

FIG. 11 shows a cross-sectional view of a second embodiment of assembly 50*b*, such as taken along line 11-11 of FIG. 10, and additionally including protective cap 40 mounted on vessel 10 via end component 22*b*. A filament band 44 is partially shown to pass over end component 22*b*, which is shown to have an upside-down "U" profile relative to vessel 10, but may have any suitable cross-sectional profile. An interior space 80*b* defined by end portion 15 and end component 22*b* may have any size or shape suitable for mounting protective cap 40 to end portion 15, and may depend on, for example, the fasteners used to mount protective cap 40 to end component 22*b*. An interior space 82*b* defined by radius wall 62 of protective cap 40 and radius surface 64 of vessel 10 is provided to allow space into which protective cap 40 may be crushed or deformed into without damaging vessel 10. The shape and/or size of interior space 82*b* may depend on, for example, the material used or application desired for protective cap 40.

Figure 12:
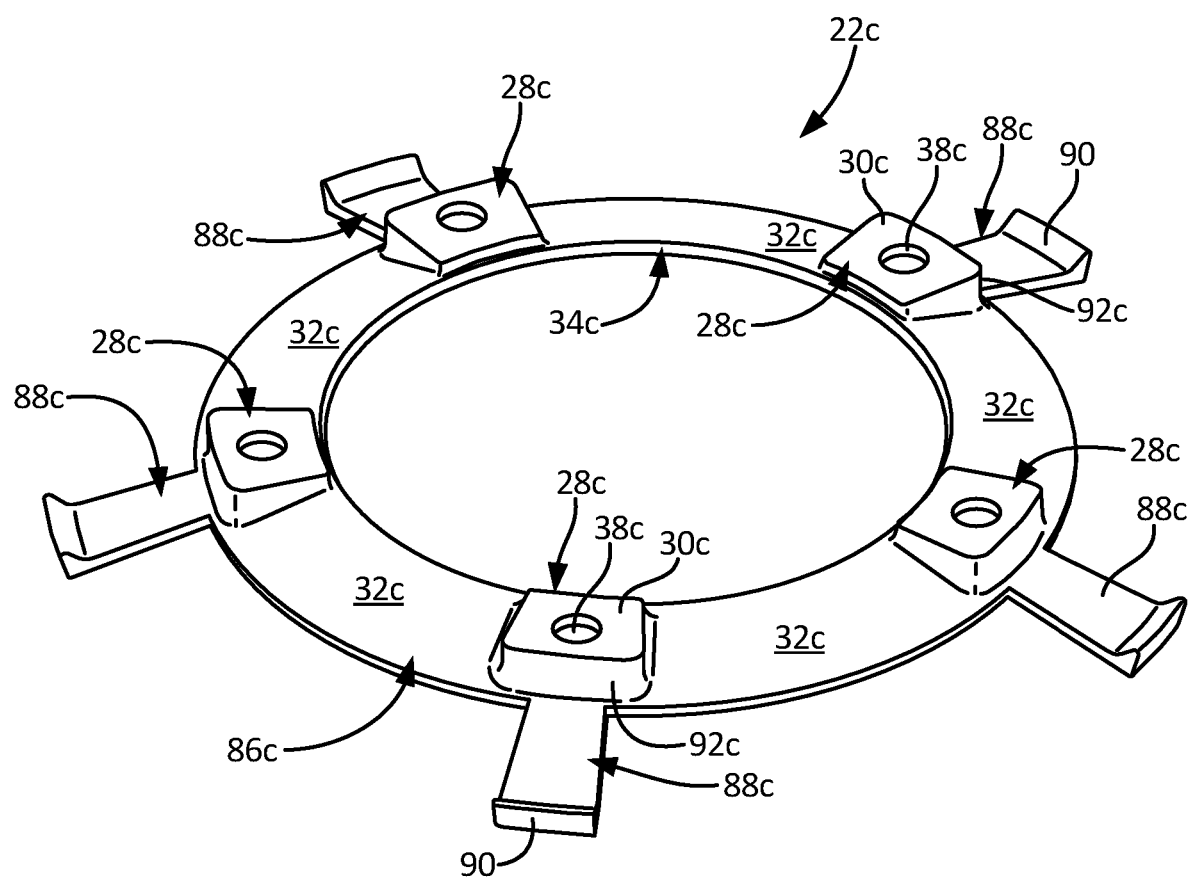
FIG. 12 shows a perspective view of a third illustrative embodiment of an end component of the present disclosure.

A third illustrative embodiment of end component 22*c*, shown in FIG. 12, includes an annular ring portion 86*c* with central opening 34*c*, and has a plurality of raised portions 28*c* spaced apart on ring 86*c*. End component 22*c* and central opening 34*c* are shown as being circular, but may be of any suitable shape. An illustrative embodiment of end component 22c includes spaced apart, radially extending tabs 88c extending outwardly from ring 86c and radially aligned with raised portions 28c. Each tab 88c may have a lip 90 disposed at a distal end and extending in a direction perpendicular to tab 88c such that tab 88c is substantially "L"-shaped. Each tab 88c is configured to accept a filament band 44 between an outer wall 92c of raised portion 28c and lip 90 such that filament bands 44 are wound upon tabs 88c and thereby secure end component 22c to vessel 10. A plurality of spaced apart attachment features 38c are disposed about ring 86, and are configured to couple with corresponding attachment features 72 on an attachment, such as protective cap 40. In an illustrative embodiment, each attachment feature 38c is disposed on a top surface 30c of one of the plurality of raised portions 28c. However, it is contemplated that attachment features 38c, such as holes, hooks, clips, or snap-in tabs for example, may be disposed at any suitable location on ring 86. Embodiments of end components 22 may include surfaces 30 on raised portions 28 having different configurations such as convex, concave, or grooved.

Figure 13:
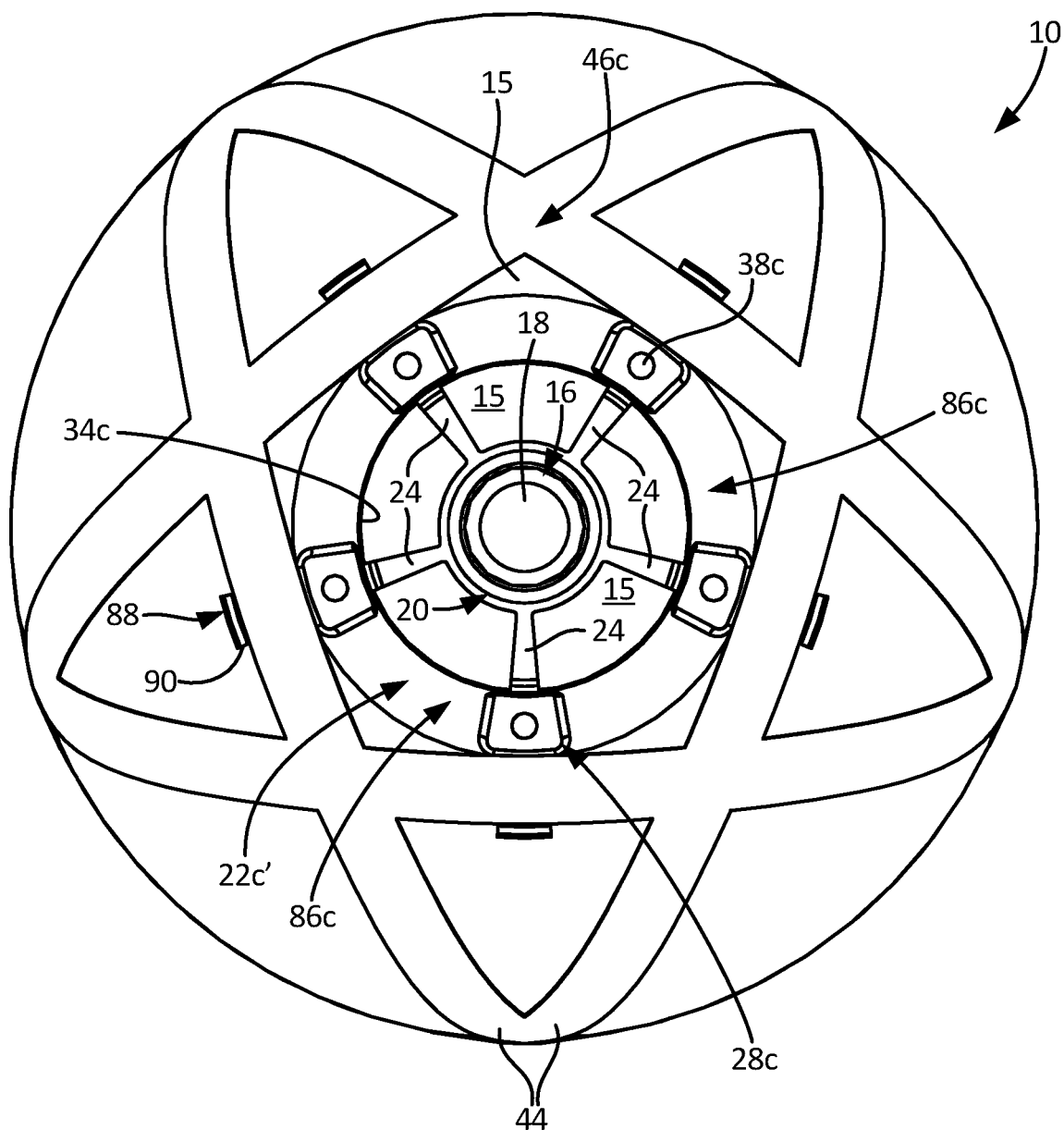
FIG. 13 shows an end view of the end component of FIG. 12 attached to an end portion of a pressure vessel by wrapped filaments.
Figure 14:
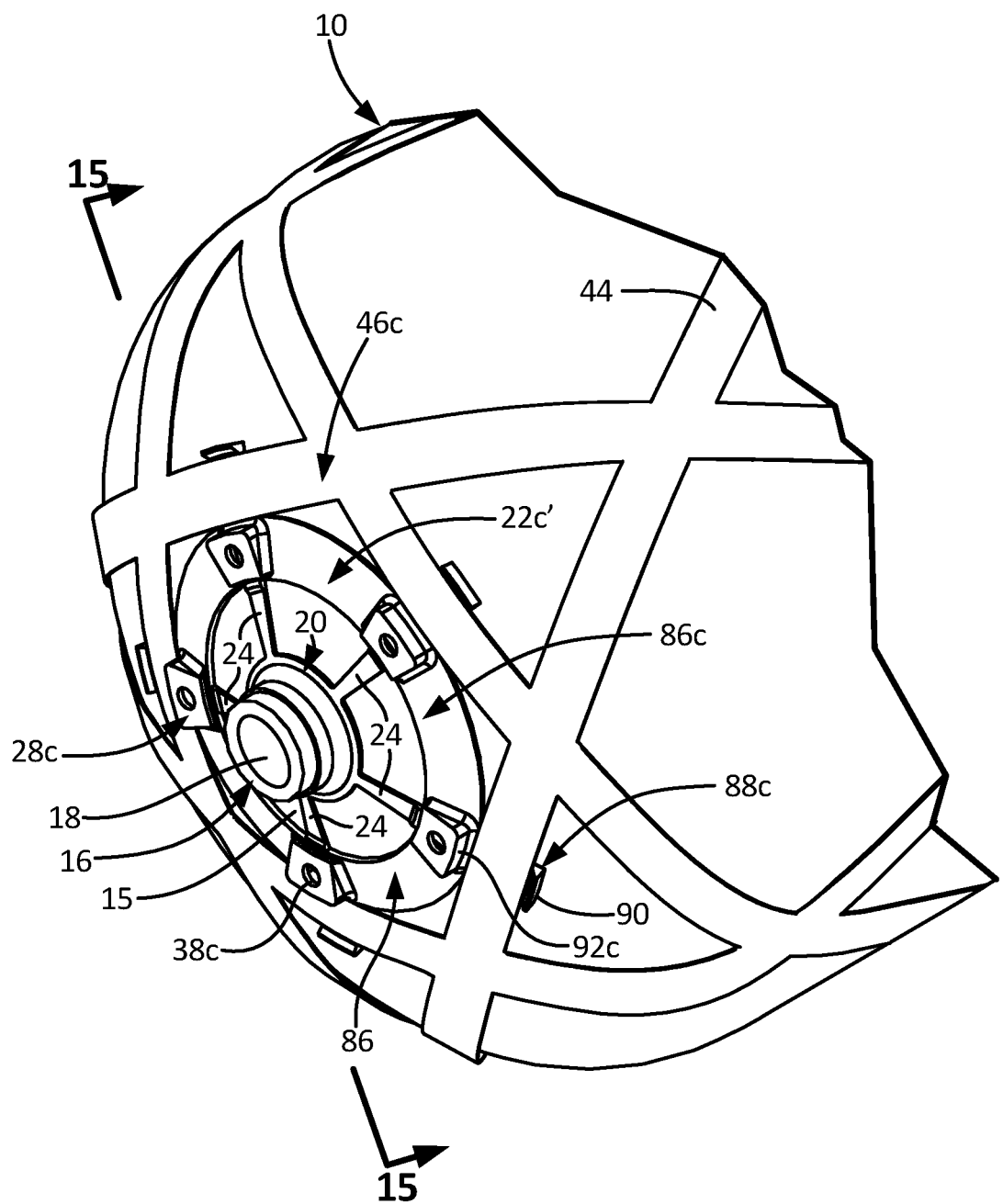
FIG. 14 shows a perspective view of the end component of FIG. 12 attached to an end portion of a pressure vessel by wrapped filaments.

FIGS. 13 and 14 show an illustrative embodiment of a modified end component 22c', which compared to end component 22c of FIG. 12, has an additional centering ring 20 attached to ring 86c by spokes 24. In the illustrated embodiment, each spoke 24 corresponds to a single raised portion 28c; however, it is contemplated that other configurations would also be suitable. End component 22c' is disposed to abut end portion 15 of vessel 10 such that boss 16 is inserted through centering ring 20. End component 22c' may have a vessel-facing surface that is contoured to follow the curvature of shell 15 such that end component 22c' is positioned substantially flush against end portion 15. End component 22c' is secured to vessel 10 by a plurality of filament bands 44. Filament bands 44 are wrapped about end portion 15 of vessel 10 and over end component 22c' such that each of the plurality of bands 44 passes over at least one of the plurality of tabs 88c, thereby forming a web 46c of filament bands 44 that are spaced about end portion 15 of vessel 10. The pattern formed by web 46c depends on the number and placement of filament bands 44 and the configuration of end component 22c'. Filament bands 44 are bonded to each other and to vessel 10 by a heat-curable resin. End component 22c' is thereby secured between web 46c and end portion 15 of vessel 10. Because filament bands 44 do not pass over ring 86c between raised portions 28c, the raised portions 28c need not be discrete structures; rather, a continuous raised portion may be provided, as in the embodiment of end component 22b, for example.

Figure 15:
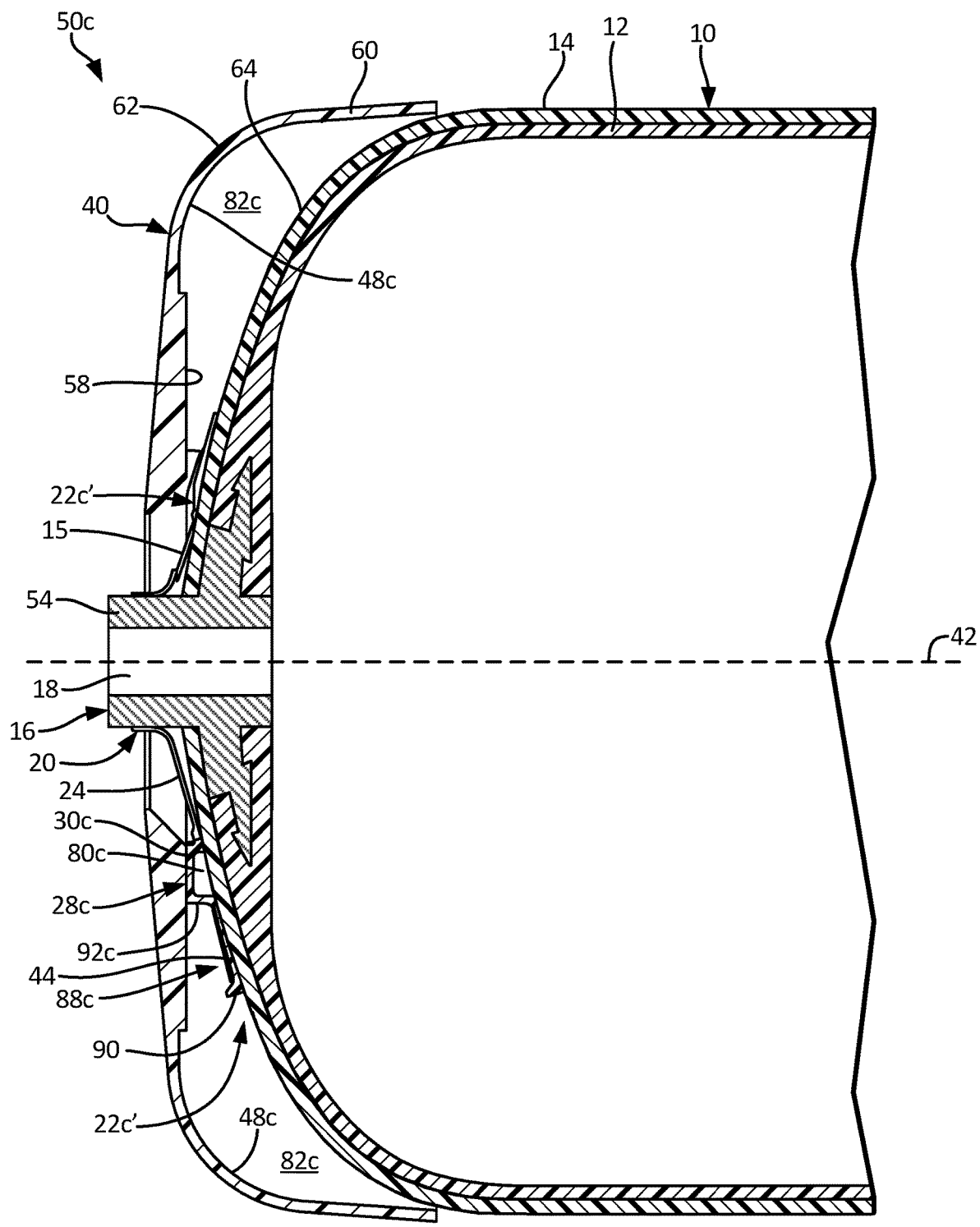
FIG. 15 is a partial cross-sectional view of a third illustrative embodiment of an assembly including a protective end cap mounted on a pressure vessel via the end component of FIG. 12. The view in FIG. 15 is taken at line 15-15 of FIG. 14; however, FIG. 15 further adds the protective end cap.

FIG. 15 shows a cross-sectional view of a third embodiment of assembly 50c, such as taken along line 15-15 of FIG. 14, and additionally including protective cap 40 mounted on vessel 10 via end component 22c'. In the illustrated embodiment, centering ring 20 has a curved cross-sectional profile to connect spokes 24 and follow neck 54 of boss 16. An interior space 82c defined by radius wall 62 of protective cap 40 and radius surface 64 of vessel 10 is provided to allow space into which protective cap 40 may be crushed or deformed into without damaging vessel 10. The shape and/or size of interior space 82c may depend on, for example, the material used or application desired for protective cap 40.

Figure 16:
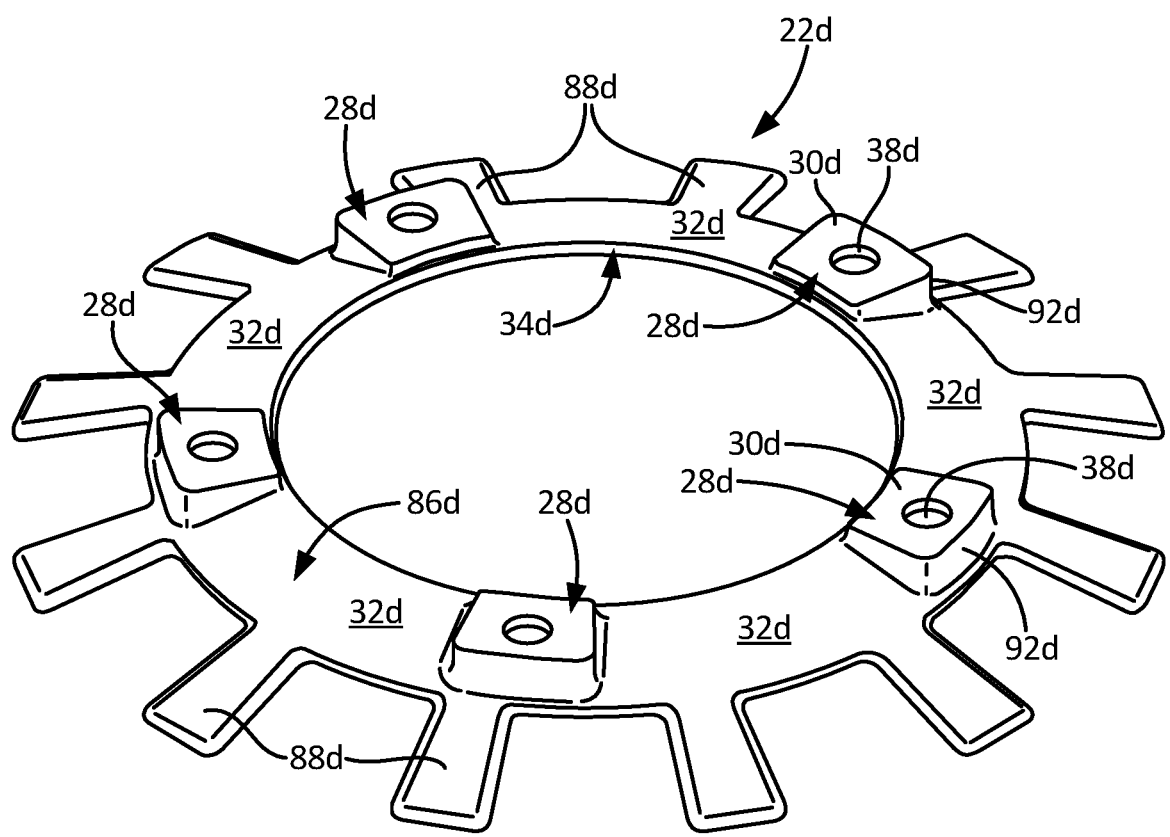
FIG. 16 shows a perspective view of a fourth illustrative embodiment of an end component of the present disclosure.

FIG. 16 shows a fourth illustrative embodiment of end component 22d including a ring 86d with central opening 34d, and having a plurality of raised portions 28d spaced apart on ring 86d, each raised portion 28d having outer wall 92d. In an exemplary embodiment, end component 22d and central opening 34d are shown as being circular, but may be of any suitable shape. An illustrative embodiment of end component 22d includes a plurality of spaced apart tabs 88d radially extending outwardly from ring 86d. Tabs 88d may or may not be radially aligned with raised portions 28d. In the illustrated embodiment, the number of tabs 88d is greater than the number of raised portions 28d, and these elements are generally not radially aligned with each other. Tabs 88d are configured to be secured between a plurality of filament bands 44 and vessel 10 as described below. A plurality of spaced apart attachment features 38d are disposed about ring 86d. In an illustrative embodiment, each attachment feature 38d is positioned on top surface 30d of one of raised portions 28d, and is configured to couple with corresponding attachment features 72 on an attachment, such as protective cap 40. However, it is contemplated that attachment features 38d, such as holes, hooks, clips, or snap-in tabs for example, may be disposed at any suitable location on ring 86d. An illustrative embodiment may include surfaces 30d positioned on raised portions 28d and having different configurations such as convex, concave, or grooved.

Figure 17:
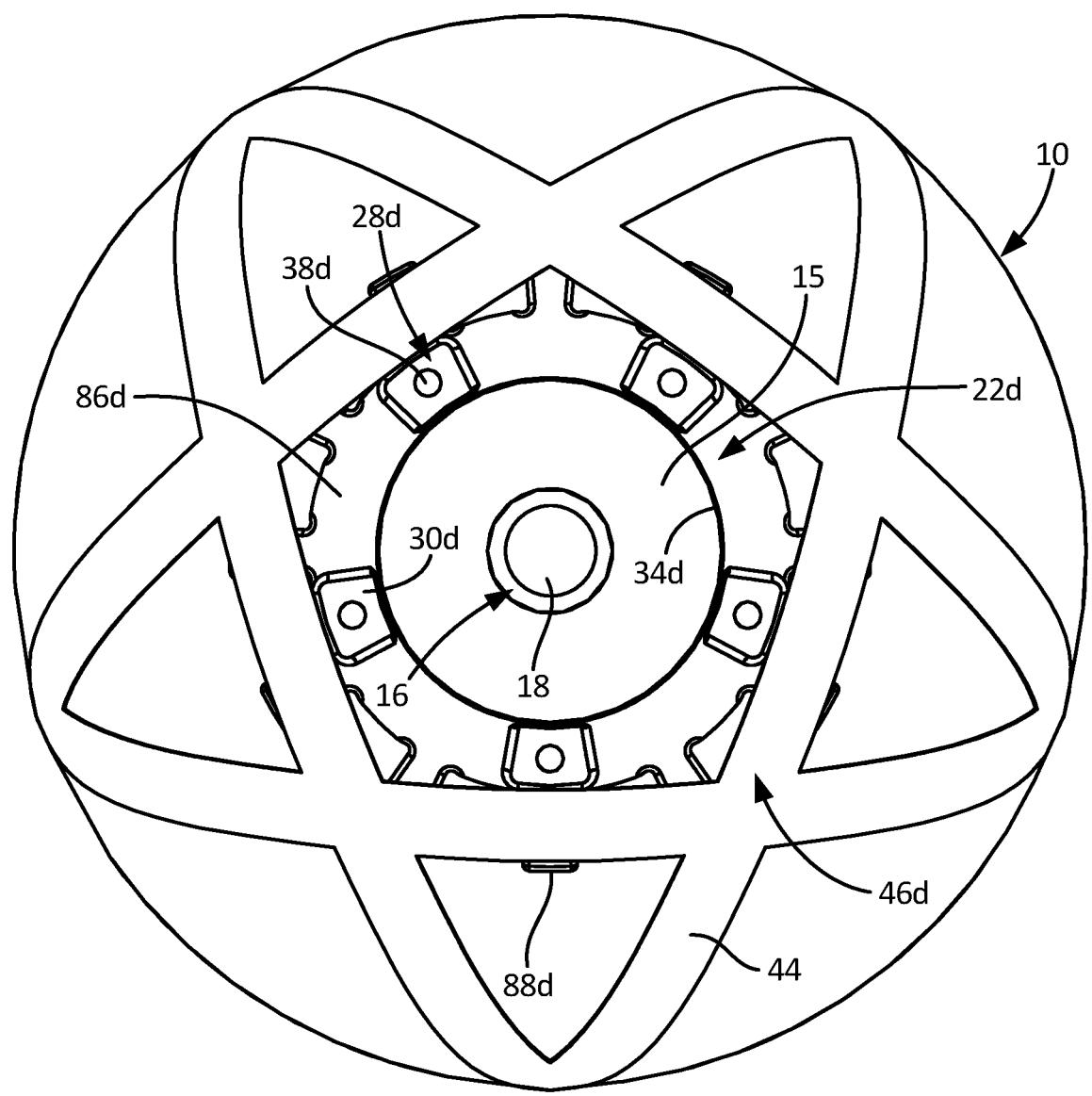
FIG. 17 shows an end view of the end component of FIG. 16 attached to an end portion of a pressure vessel by wrapped filaments.
Figure 18:
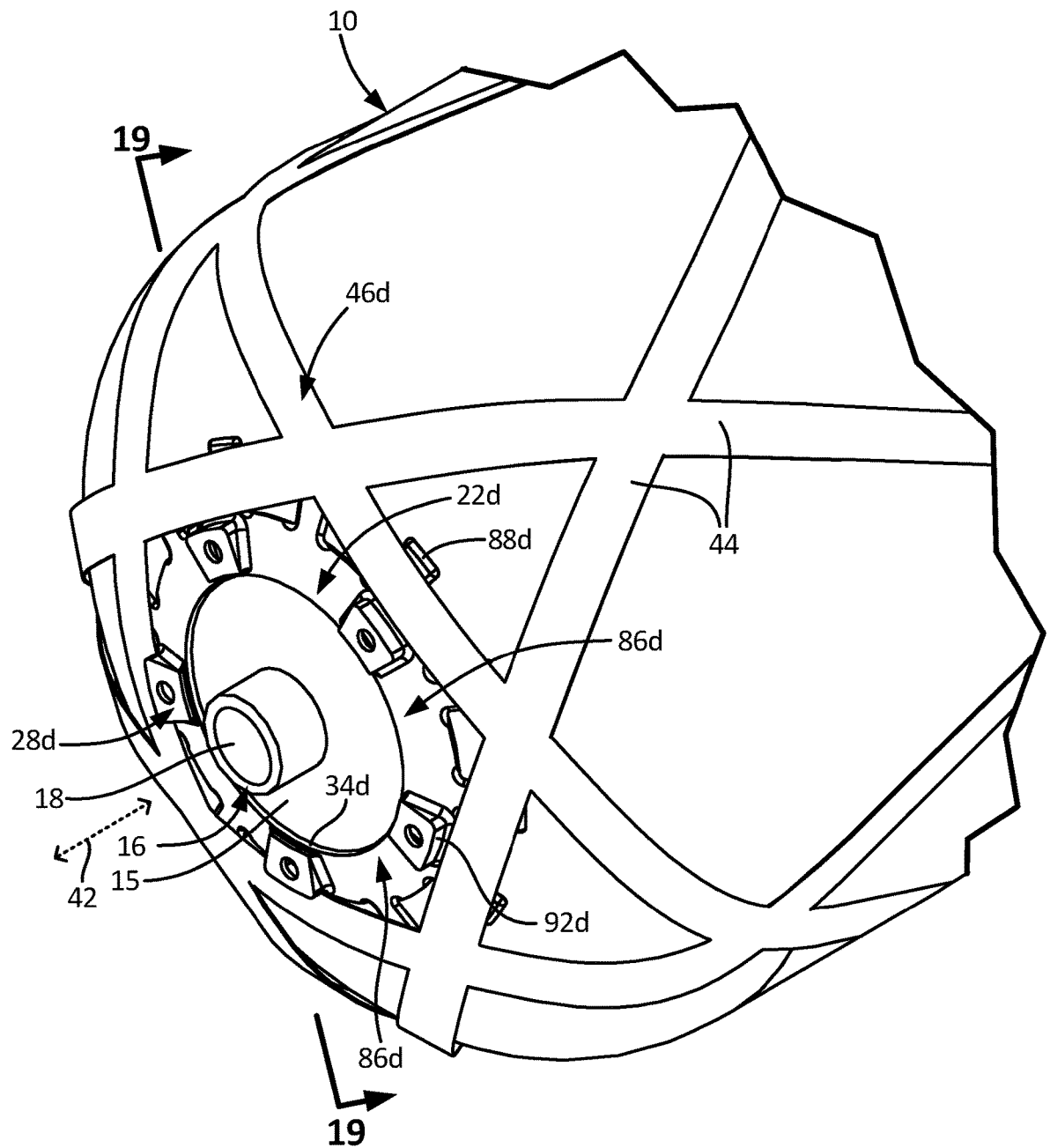
FIG. 18 shows a perspective view of the end component of FIG. 16 attached to an end portion of a pressure vessel by wrapped filaments.

FIGS. 17 and 18 show an illustrative embodiment of 22d disposed to abut end portion 15 of vessel 10 such that boss 16 is inserted through central opening 34d. End component 22d may have a vessel-facing surface that is contoured to follow the curvature of shell 15 such that end component 22d is positioned substantially flush against end portion 15. End component 22d is secured to vessel 10 by a plurality of filament bands 44. Filament bands 44 are wrapped about end portion 15 of vessel 10 and over end component 22d such that each of the plurality of bands 44 passes over at least one of the plurality of tabs 88d, thereby forming a web 46d of filament bands 44 that are spaced about end portion 15 of vessel 10. The pattern formed by web 46d depends on the number and placement of filament bands 44 and the shape and configuration of end component 22d. Because of the high number of tabs 88d, end component 22d may be disposed in any rotational position relative to longitudinal axis 42, and precise rotational clocking of web pattern 46d relative to end component 22d is not required. Filament bands 44 are bonded to each other and to vessel 10 by a heat-curable resin. End component 22d is thereby secured between web 46 and end portion 15 of vessel 10. Because filament bands 44 do not pass over ring 86d between raised portions 28d, the raised portions 28d need not be discrete structures; rather, a continuous raised portion may be provided, as in the embodiment of end component 22b, for example.

Figure 19:
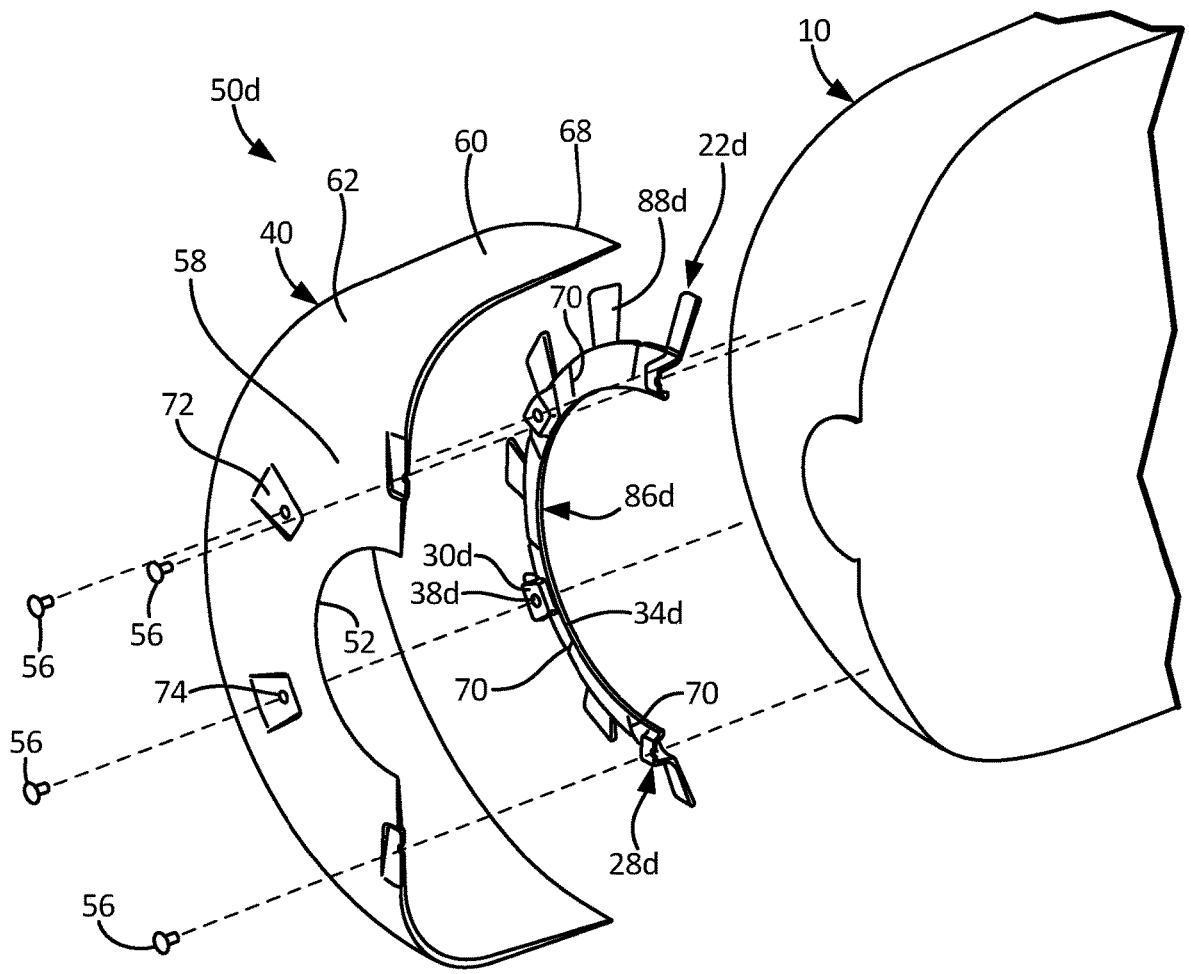
FIG. 19 shows an exploded cross-sectional view of an illustrative fourth embodiment of an assembly including a protective end cap to be mounted on a pressure vessel via fasteners and the end component of FIG. 16. The view in FIG. 19 is taken at line 19-19 of FIG. 18; however, FIG. 19 further adds the protective end cap and shows the components separated from each other.

FIG. 19 shows an exploded vertical cross-sectional view of a second embodiment of assembly 50d, such as taken along line 19-19 of FIG. 18, and additionally including protective cap 40 configured to be mounted on vessel 10 via end component 22d. Assembly 50d has fasteners 56, such as screws, bolts, snaps, or push-in fasteners, aligned with holes 74 in attachment features 72 of protective cap 40 and aligned with attachment features 38d in raised portions 28d of end component 22c. Hole 52 in protective cap 40 is concentrically aligned with central opening 34d in end component 22d and boss 16 of pressure vessel 10 (not shown in FIG. 19).

As shown in FIGS. 19 and 22-24, end component 22 may include slits 70 in ring 86 to increase the flexibility of ring 86 so that it can better conform to the contours of end portion 15 of underlying pressure vessel 10. It is to be understood that such slits, grooves or similar shape accommodating features may be provided on any of the embodiments of the disclosed end components 22.

Figure 20:
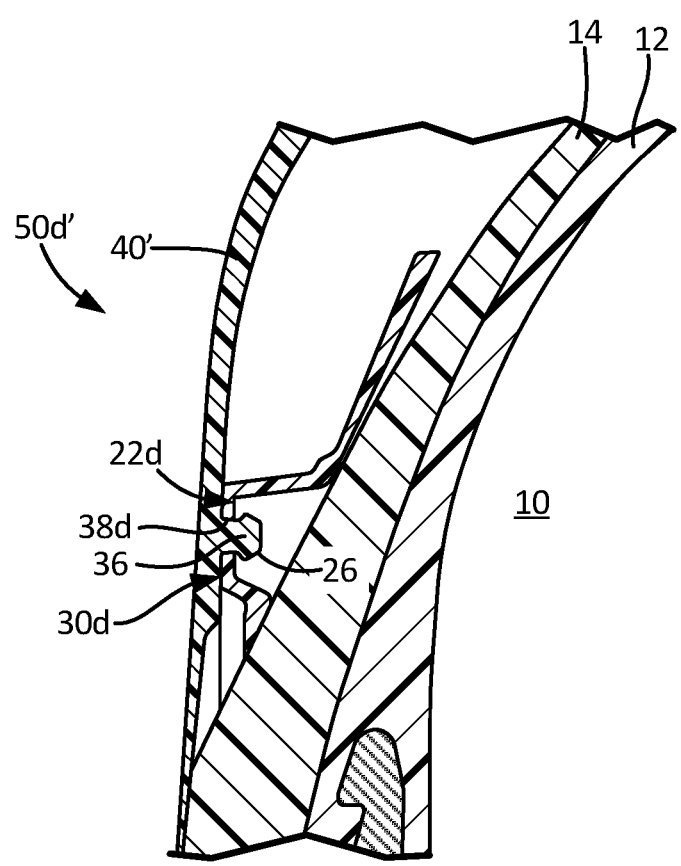
FIG. 20 is an enlarged vertical cross-sectional view of an assembly including a protective end cap mounted on a pressure vessel via a push-in fastener integrally formed with the protective end cap, via the end component of FIG. 16.
Figure 21:
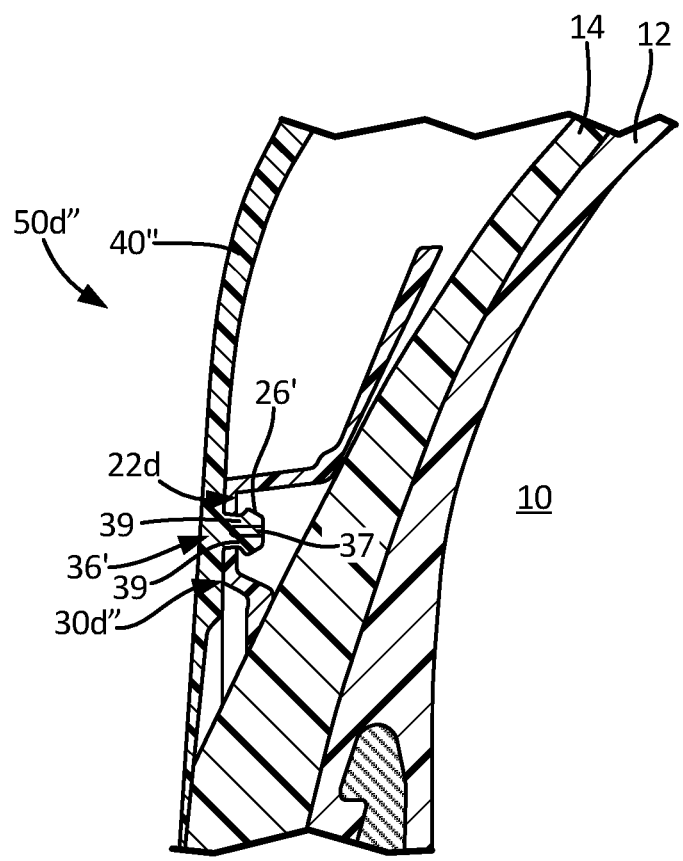
FIG. 21 is an enlarged vertical cross-sectional view of an assembly including a protective end cap mounted on a pressure vessel via a different push-in fastener integrally formed with the protective end cap, via the end component of FIG. 16.

FIGS. 20 and 21 show partial cross-sectional views of assembly 50d' and 50d", respectively, including protective end cap 40', 40" attached to pressure vessel 10 via end component 22d using different push-in fasteners 36, 36'. In these illustrated embodiments, the attachment features of protective cap 40 are push-in fasteners 36, 36' integrated into end cap 40', 40", and are coupled to end component 22d at attachment features 38d on 28d. Each fastener 36, 36' includes a flared end 26, 26' that is configured to pass through attachment feature 38d and remain in the inserted configuration. As shown in FIG. 21, fastener 36' has gap 37 between arms 39. Arms 39 are allowed are flex into gap 37 to facilitate the passage of flared end 26' through attachment feature 38d.

Figure 22:
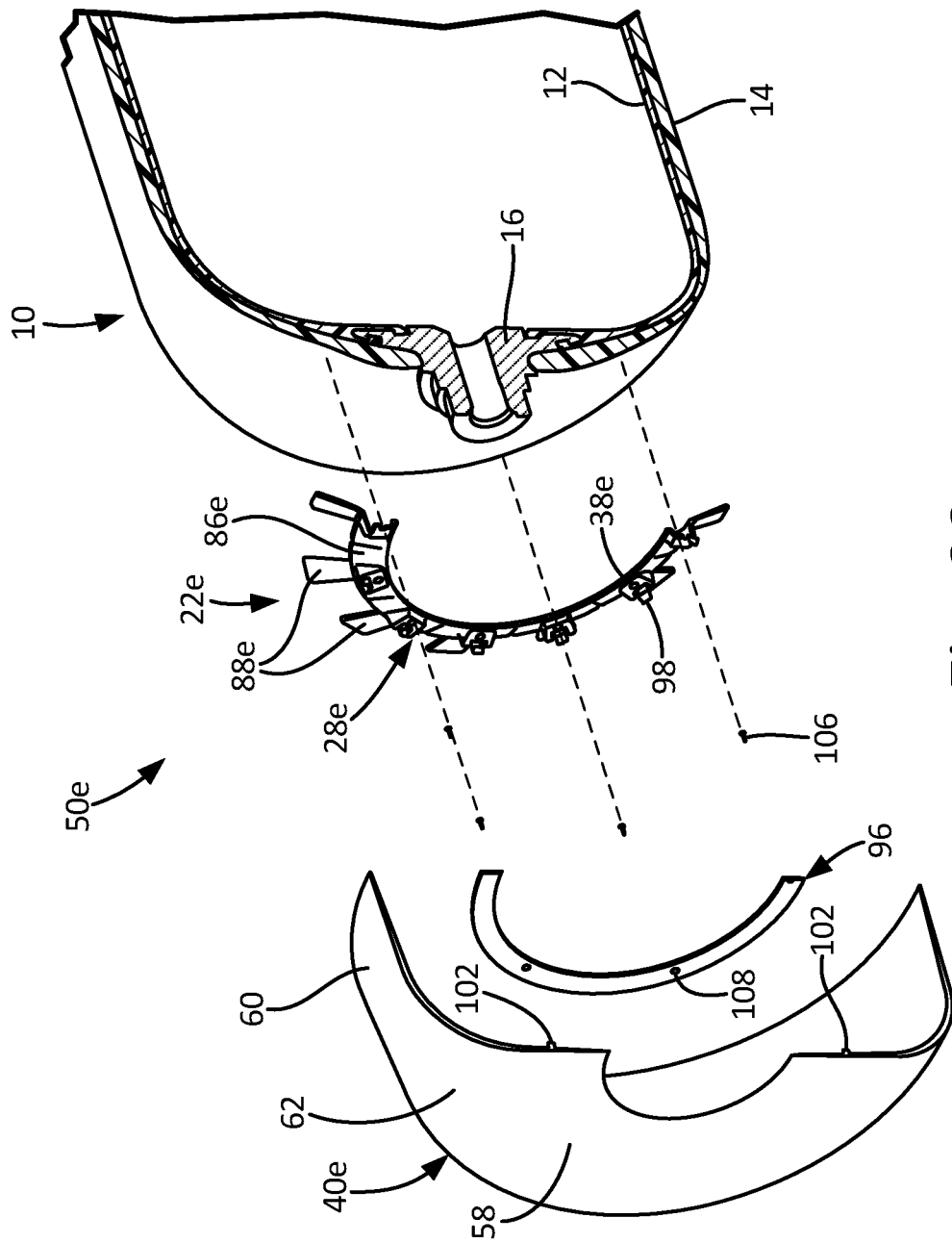
FIG. 22 shows a perspective vertical cross-sectional exploded view of a fifth illustrative embodiment of an assembly including a protective end cap mounted on a pressure vessel via an insert, fasteners, and a modified embodiment of the end component of FIG. 16 including snap-fit joints.
Figure 23:
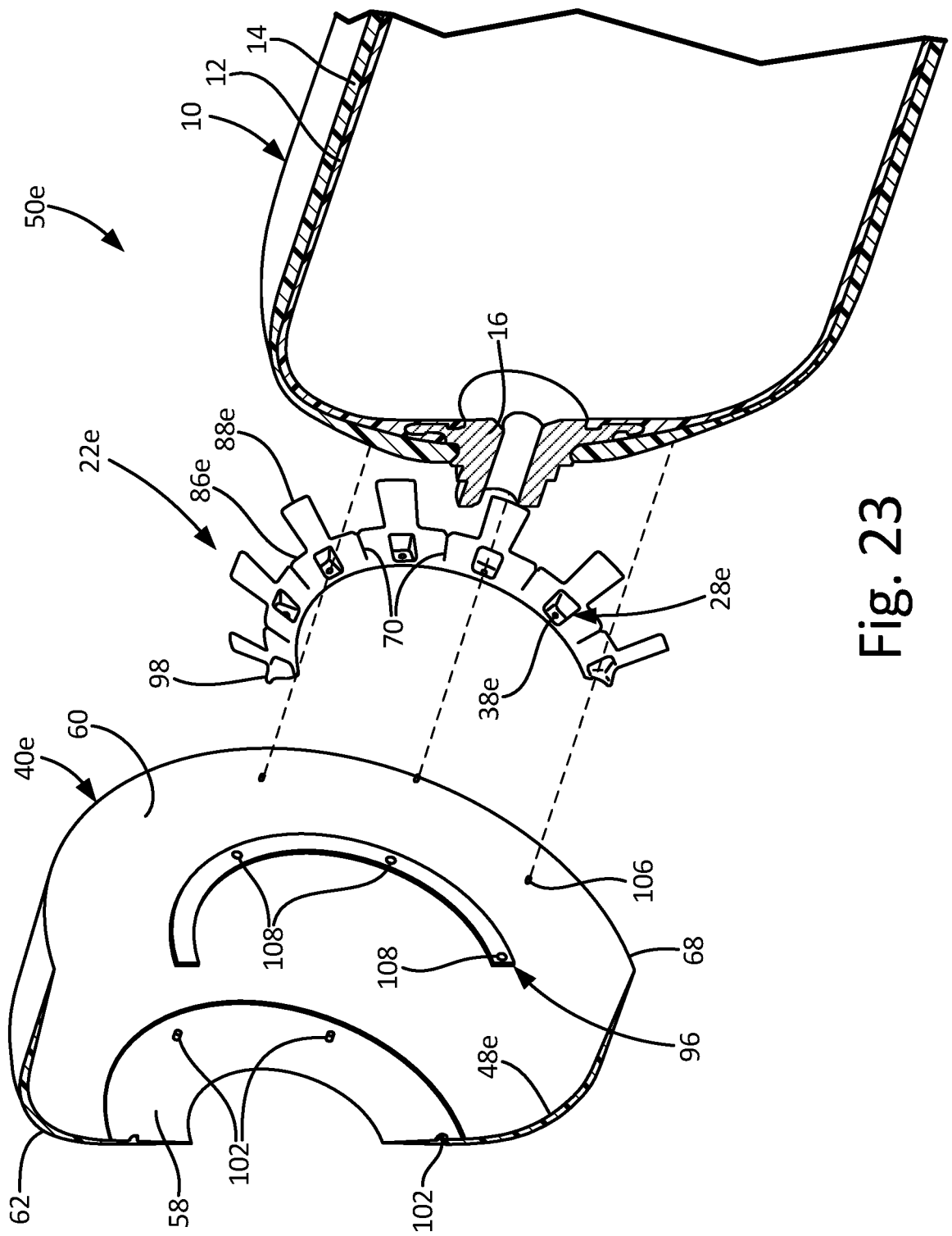
FIG. 23 shows a rear exploded view of the assembly of FIG. 22.
Figure 24:
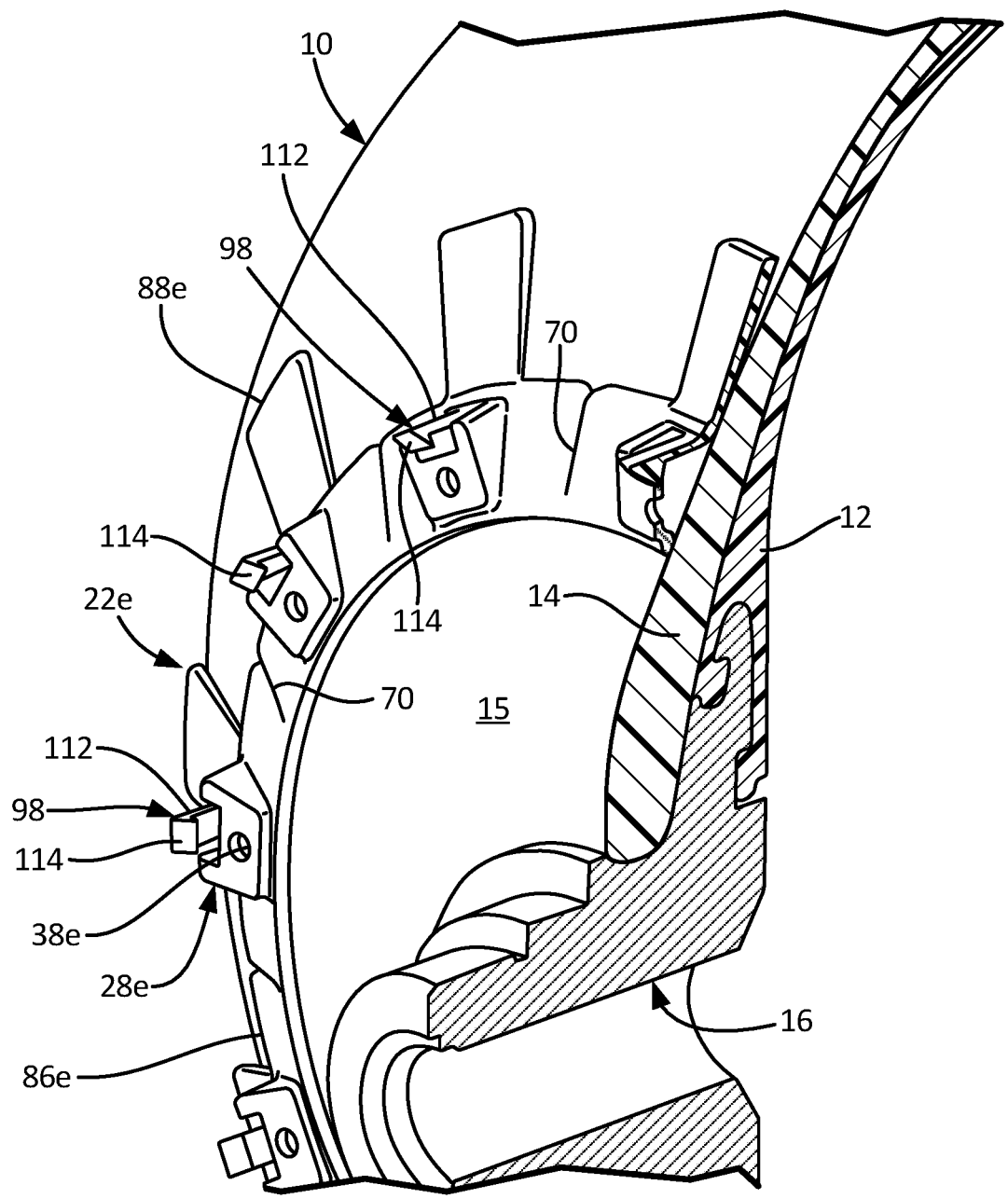
FIG. 24 shows an enlarged partial perspective vertical cross-sectional view of the end component and pressure vessel of FIG. 22, in a partially assembled state.
Figure 25:
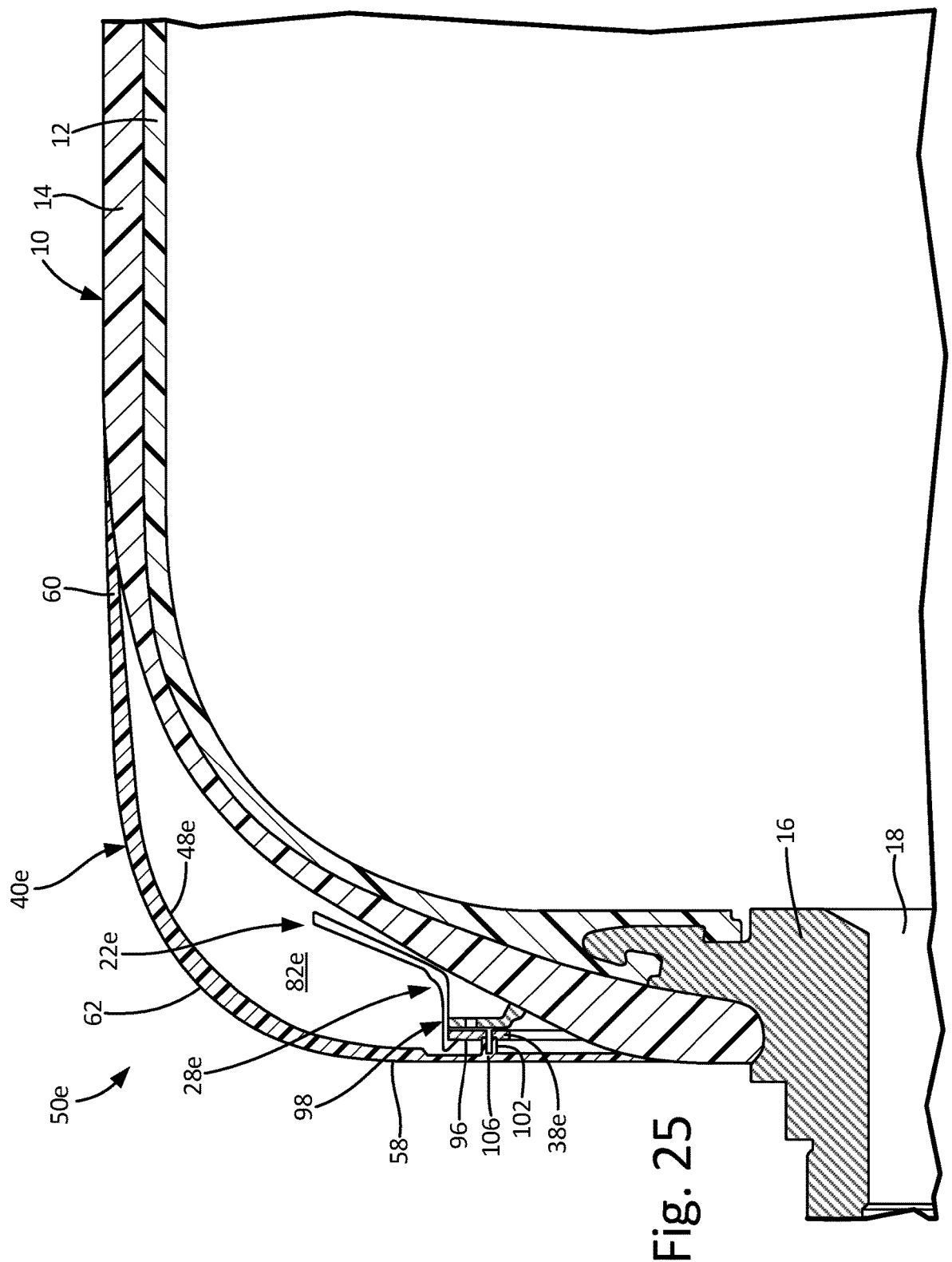
FIG. 25 shows a partial vertical cross-sectional view of the assembly of FIG. 22, in an assembled state.

FIGS. 22-25 show a fifth exemplary embodiment of end component 22e having snap fit tabs 98 and attachment features 38e on top surfaces 30d of raised portions 28e. FIGS. 22, 23, and 25 show a fifth embodiment of an assembly 50e including protective cap 40 configured for mounting on an end portion 15 of vessel 10 via end component 22e and snap-fit insert 96. For clarity, filament bands 44 attaching end component 22d to vessel 10 are not shown, but it is contemplated that such filament bands 44 would be provided in the form of a web 46 over tabs 88e, as described above with reference to tabs 88d of end component 22d.

Figure 26:
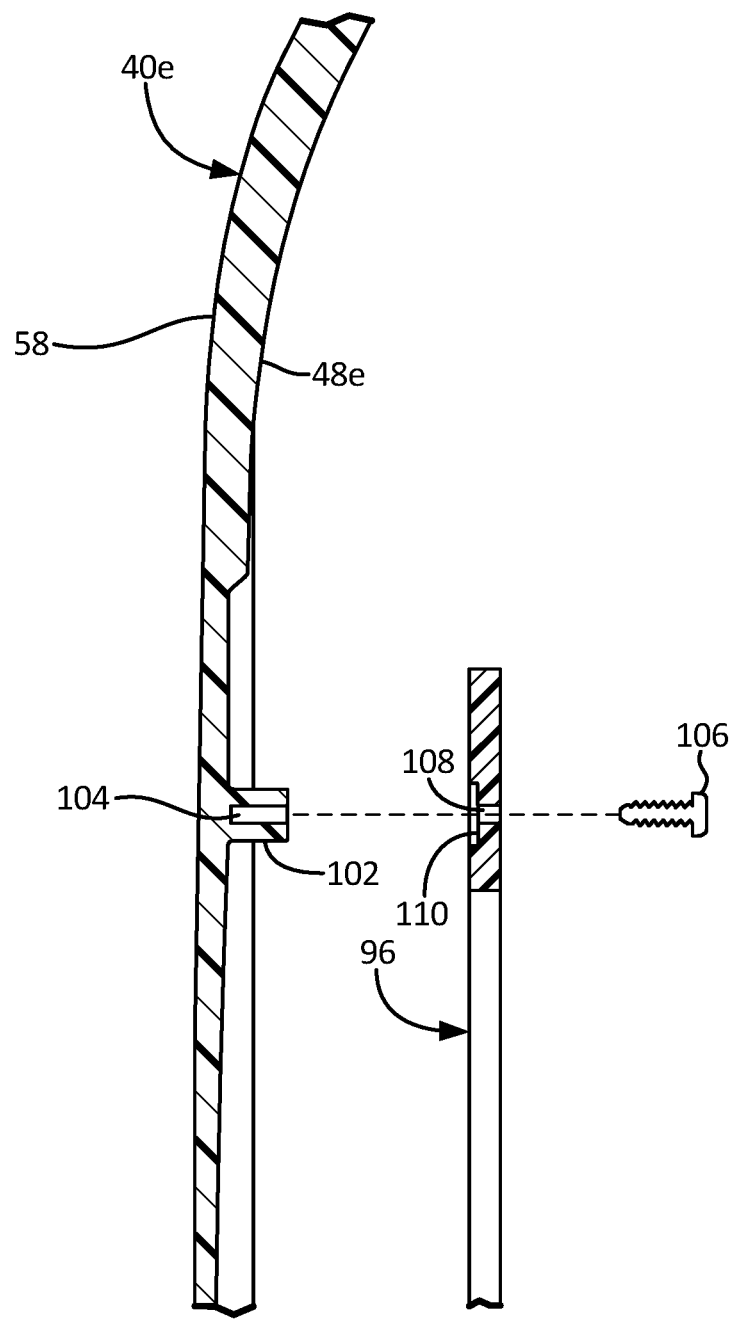
FIG. 26 shows an enlarged exploded view of an illustrative embodiment of a protective end cap including an attachment feature, the insert of FIG. 22 including a hole, and a fastener.
Figure 27:
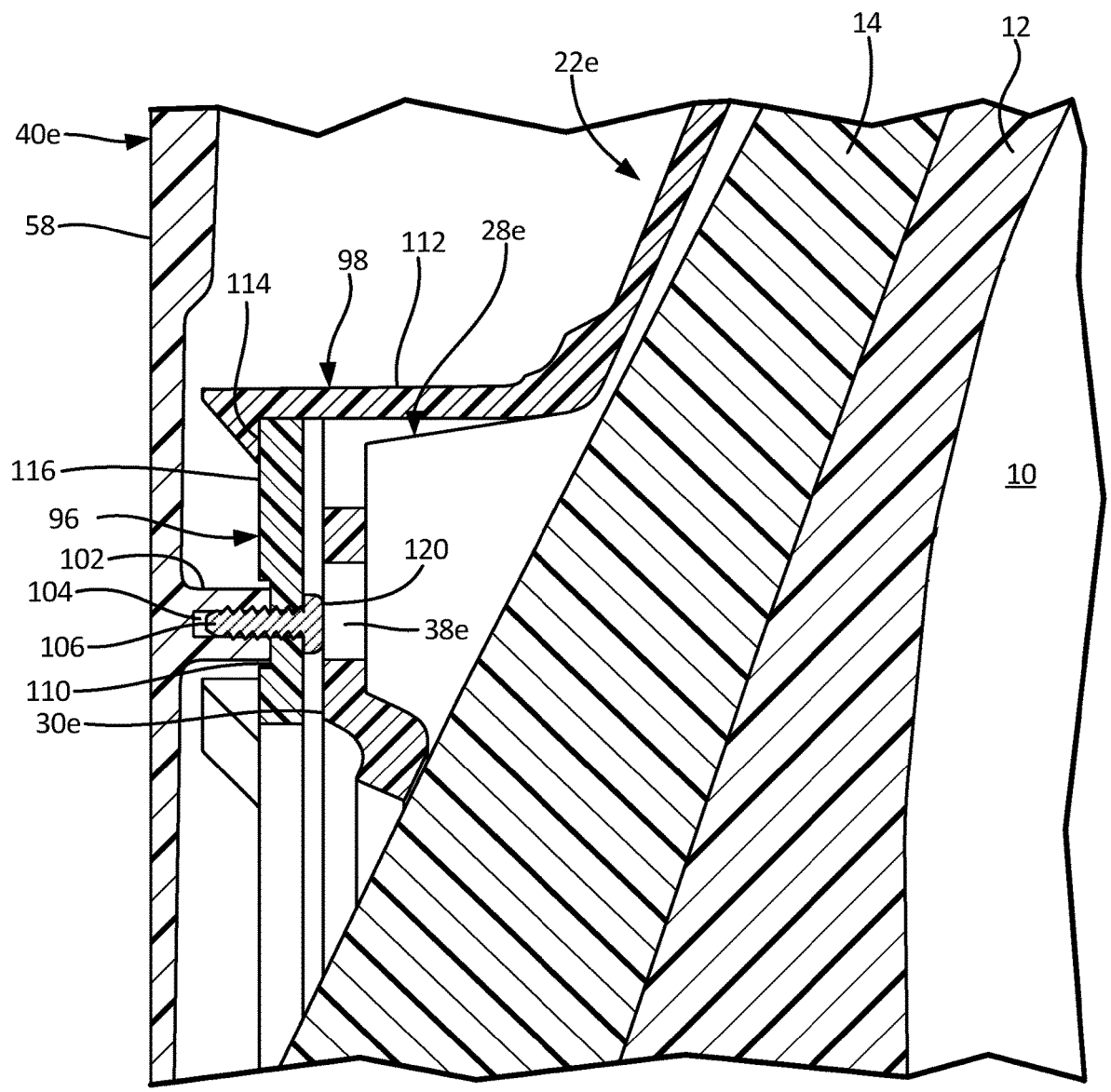
FIG. 27 shows an enlarged sectional view of the assembly of FIG. 22 showing the insert coupled to the protective end cap by fasteners and to the end component by snap-fit joints.

Attachment features on protective cap 40e may be sleeves 102, each having a bore 104 therethrough configured to accept a fastener 106, such as a screw or bolt as shown in FIGS. 22-23 and 25-26. Bores 104 may or may not penetrate end wall 58. An exemplary snap-fit insert 96 is an annular piece configured to be positioned at the internal surface 48 of end wall 58, and includes holes 108 aligned with sleeve 102 on protective cap 40e such that fastener 106 may be inserted through both hole 108 in insert 96 and bore 104 in sleeve 102, thereby attaching insert 96 to protective cap 40e, as shown in FIGS. 25-27. Sleeve 102 is positioned in recess 110 in insert 96 to stabilize insert 96 relative to end wall 58. An interior space 82e defined by radius wall 62 of protective cap 40e and radius surface 64 of vessel 10 is provided to allow space into which protective cap 40e may be crushed or deformed into without damaging vessel 10. The shape and/or size of interior space 82e may depend on, for example, the material used or application desired for protective cap 40.

FIG. 27 shows an embodiment of snap fit insert 96 coupled with snap fit joint 98 to mount protective cap 40e to end component 22e, and thus vessel 10. Snap fit joint 98 includes arm 112 and lip 114 configured to accept an edge 116 of insert 96. The resilient nature of joint 98 allows arm 112 to be moved away from insert 96 when insert 96 is pressed toward joint 98, then snap back over edge 116 to secure edge 116 with lip 114. Raised portion 28e of end component 22e includes hole 38e to accept a head 120 of fastener 106, allowing insert 96 to be positioned flush with surface 30e of raised portion 28e. Sleeve 102 spaces insert 96 from end wall 58 allowing room for fastener 106 and snap-fit joints 98. It is understood that different snap-fit configurations may be used, such as inserts of other shapes, more or fewer snap-fit joints, or snap-fit joints of different types, for example.

Figure 28:
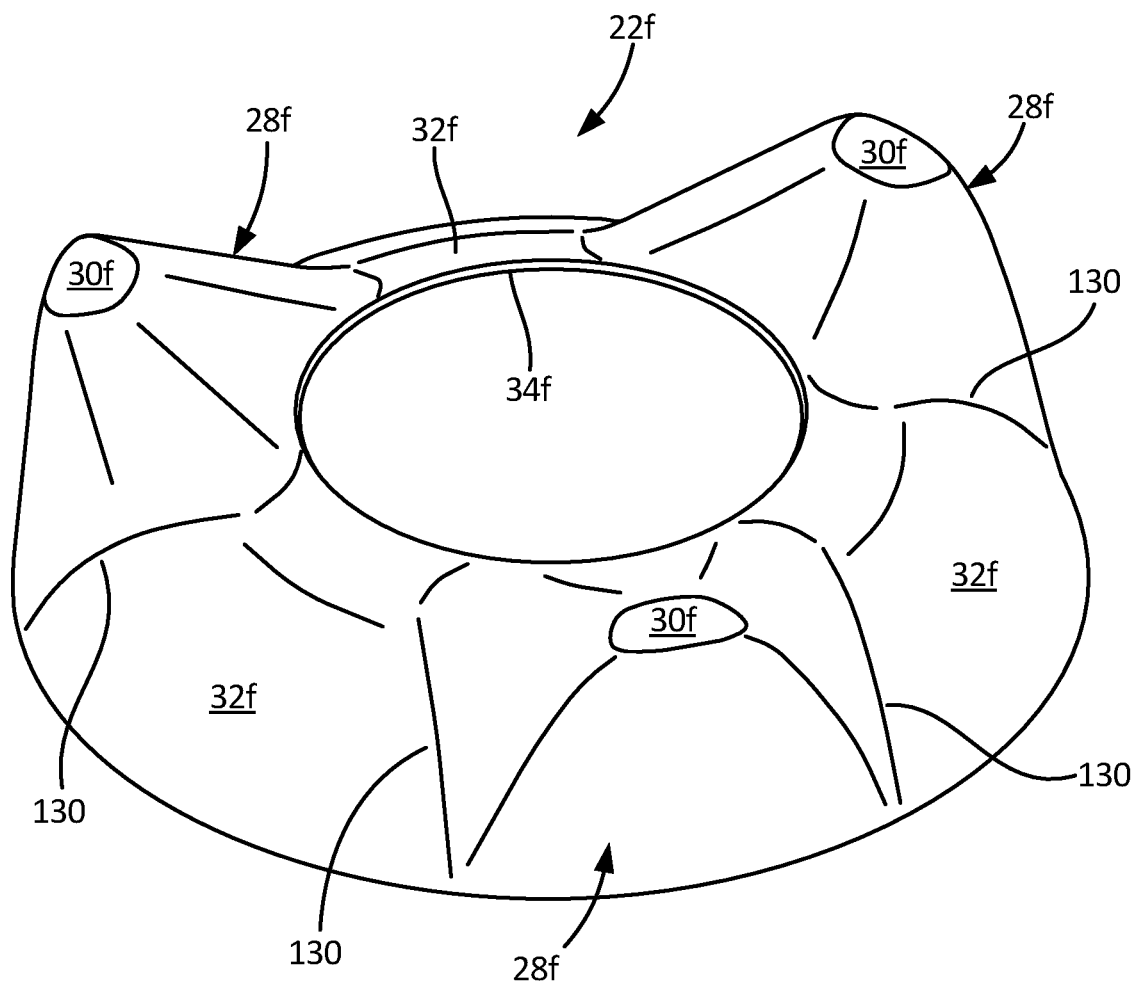
FIG. 28 shows a perspective view of a sixth illustrative embodiment of an end component of the present disclosure.

A sixth illustrative embodiment of annular end component 22f is shown in FIG. 28. Annular end component 22f may incorporate at least some or all of the damage mitigating characteristics of the protective cap 40 described herein. An illustrative embodiment of end component 22f has a central opening 34f and includes a plurality of raised portions 28f defining a plurality of low portions 32f therebetween. In an exemplary embodiment, end component 22f and central opening 34f are shown as being circular, but may be of any suitable shape. Raised portions 28f may be protective features that act as bumpers to mitigate damage to vessel 10 due to, for example, impact or scraping. An interior space 126 (see FIG. 31) defined by raised portions 28f and vessel 10 allows space into which raised portion 28f may be crushed or deformed without damaging vessel 10. The shape and/or size of raised portions 28f, and therefore interior space 126, may depend on, for example, the material of end component 22f and/or the desired application for vessel 10. In an illustrative embodiment, raised portions 122 are substantially pyramidal trapezoids. In an illustrative embodiment, parts of low portions 32f of end component 22f are contoured to fit substantially flush with end portion 15 of vessel 10.

Figure 29:
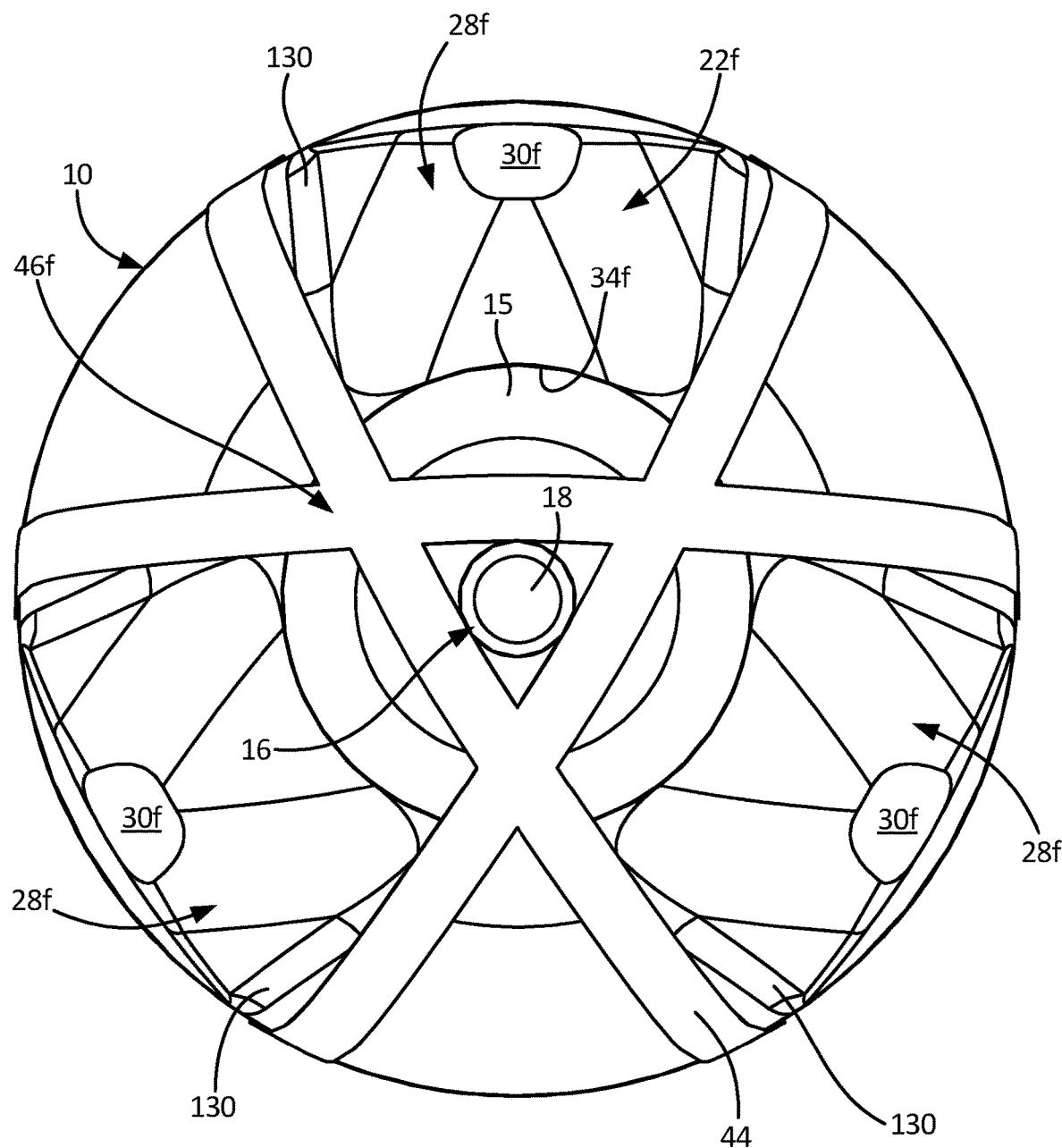
FIG. 29 shows an end view of the end component of FIG. 28 attached to an end portion of a pressure vessel by wrapped filaments.
Figure 30:
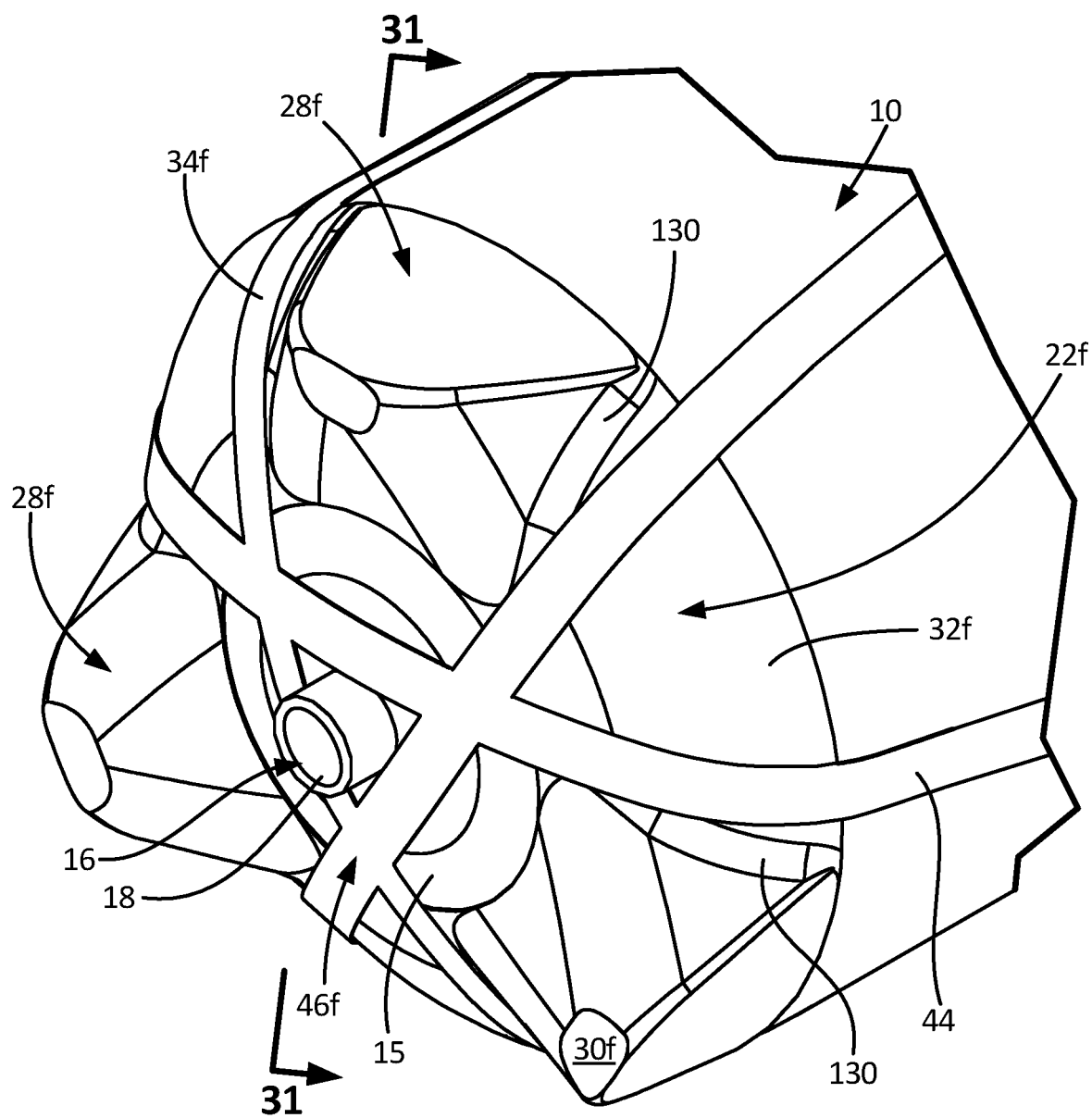
FIG. 30 shows a perspective view of the end component of FIG. 28 attached to an end portion of a pressure vessel by wrapped filaments.

FIGS. 29 and 30 show end component 22f disposed on end portion 15 of vessel 10 such that a boss 16 of vessel 10 is inserted through central opening 34f. End component 22f is secured to vessel 10 by a plurality of filament bands 44. The plurality of filament bands 44 are arranged so that at least one of the filament bands 44 passes over one of the plurality of low portions 32f, extends past and adjacent to boss 16, and passes over another of the plurality of low portions 32f. The plurality of filament bands 44 are arranged so that at least one of the filament bands 44 is passed over each of a different pair of low portions 32f, thereby forming a web 46f of filament bands 44 that are spaced about end portion 15 of vessel 10. The pattern formed by web 46f depends on the number and placement of filament bands 44 and the configuration of end component 22f. In an illustrative embodiment, a filament band 44 passes adjacent to each of a plurality of side walls 130 of end components 22f, extends past and adjacent to boss 16, and passes adjacent to another of the plurality of side walls 130. Thus, two filament bands 44 pass over each of the plurality of low portions 32f. Filament bands 44 are bonded to each other and to vessel 10 by a heat-curable resin. End component 22f is thereby secured between web 46f and end portion 15 of vessel 10.

Figure 31:
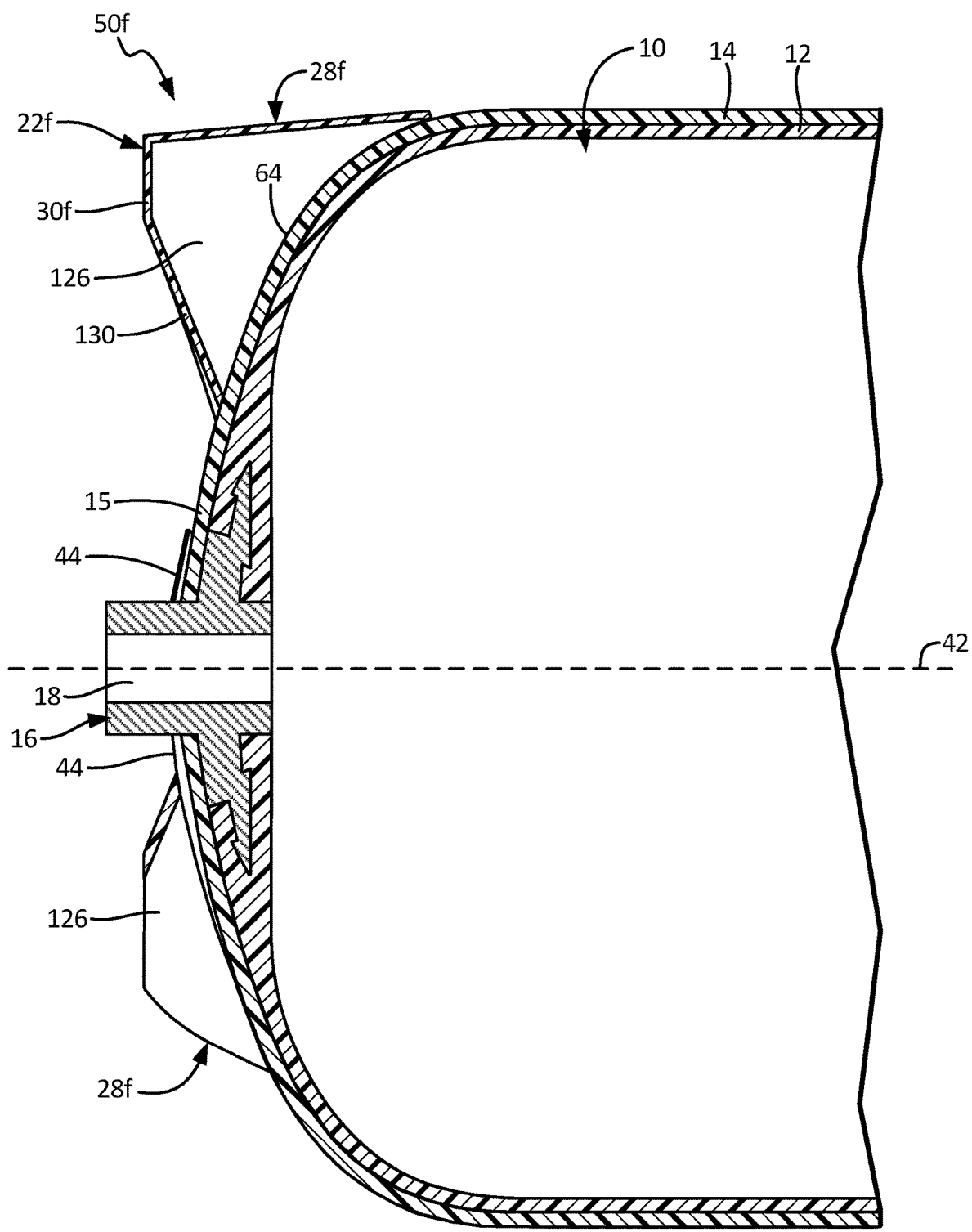
FIG. 31 is a partial sectional view of a sixth embodiment of an assembly including the end component of FIG. 28 attached to an end portion of a pressure vessel.

FIG. 31 shows a partial cross-sectional view of end component 22f mounted on end portion 15 of vessel 10, taken along line 31-31 of FIG. 30. A filament band 44 is partially shown to pass over a low portion 32f that is obscured in this view by end portion 15. In an illustrative embodiment, raised portion 28f is configured to have substantially a pyramidal trapezoid shape, relative to shell 14, but may have any suitable cross-sectional profile. Interior space 126 defined by raised portion 28f of end component 22f and end portion 15 of vessel 10 is provided to allow space into which end component 22f may be crushed or deformed into without damaging vessel 10. The shape and/or size of interior space 126 may depend on, for example, the material used or application desired for protective end component 22f. Moreover, foam or other damage mitigating materials may be provided in interior space 126.

A method of securing end component 22 to pressure vessel 10 includes positioning the end component 22 at domed end portion 15 of pressure vessel 10 and mounting boss 16 on a mandrel. Composite material is wound over portions of end component 22, end portion 15, and in some cases part of the cylindrical body of pressure vessel 10 in the form of filament bands 44 to form filament web 46, which attaches end component 22 to end portion 15. The laminated layers of wound fiberglass fibers or filaments or other synthetic filaments are bonded together by a thermal-setting or thermoplastic resin. The fiber may be fiberglass, aramid, carbon, graphite, or any other generally known fibrous reinforcing material. The resin matrix used may be epoxy, polyester, vinyl ester, thermoplastic or any other suitable resinous material capable of providing fiber-to-fiber bonding, fiber layer-to-layer bonding, and the fragmentation resistance required for the particular application in which the vessel is to be used. In an exemplary method, a dispensing head for the fibers moves in such a way as to wrap the fiber on the end component 22 and pressure vessel 10 in a desired pattern for web 46. Such fiber winding is normally applied in both a substantially longitudinal (helical) and a circumferential (hoop) wrap. This winding process is defined by a number of factors, such as resin content, fiber configuration, winding tension, and the pattern of the wrap in relation to the axis 42 of pressure vessel 10. Details relevant to a suitable filament winding process are disclosed in U.S. Pat. No. 4,838,971, entitled "Filament Winding Process and Apparatus," which is incorporated herein by reference.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

What is claimed is:

1. An assembly including:
   a pressure vessel for containing a fluid, the pressure vessel including an outer surface and a domed end portion; and
   a component positioned at the domed end portion, wherein the component is attached to the outer surface by a plurality of filament bands wound upon the domed end portion and over at least a part of the component.

2. The assembly of claim 1, wherein the component includes an attachment feature.

3. The assembly of claim 2 wherein the assembly further includes a protective cap, and wherein the protective cap is coupled to the component via the attachment feature.

4. The assembly of claim 3, wherein the attachment feature includes a snap-fit joint, the assembly further including:
   an insert coupled to a vessel-facing surface of the protective cap, wherein the insert is configured to couple to the snap-fit joint.

5. The assembly of claim 1 wherein the component is annular.

6. The assembly of claim 1, wherein the component includes a plurality of radially extending tabs, and wherein at least one of the plurality of filament bands is wound upon at least one of the plurality of tabs.

7. An apparatus configured for preventing damage to a pressure vessel, the pressure vessel including an outer surface and a domed end portion, the apparatus including:
   a component configured to be positioned at the domed end portion, wherein the component is configured to be attached to the outer surface of the domed end portion of the pressure vessel by a plurality of filament bands wound upon the domed end portion and over at least a part of the component.

8. The apparatus of claim 7, and wherein the component includes an attachment feature.

9. The apparatus of claim 8, further including a protective cap, and wherein the protective cap is configured to be coupled to the component via the attachment feature.

10. The apparatus of claim 9, wherein the attachment feature includes a snap-fit joint, and the apparatus further includes:
    an insert configured to be coupled to a vessel-facing surface of the protective cap, wherein the insert is configured to couple to the snap-fit joint.

11. The apparatus of claim 7, wherein the component includes a plurality radially extending tabs.

12. The apparatus of claim 7, wherein the component includes:
    a plurality of raised portions; and
    a low portion between two adjacent raised portions.

13. The apparatus of claim 12, wherein at least one of the plurality of raised portions is shaped as a pyramidal trapezoid.

14. The apparatus of claim 7, wherein the component is annular.

15. The apparatus of claim 7, wherein the component includes:
    a plurality of raised portions; and
    a plurality of low portions,
    wherein the plurality of raised portions and the plurality of low portions are arranged in an alternating pattern.

16. A method for attaching a component to a pressure vessel, the pressure vessel having an outer surface and including a domed end portion, the method including:
    positioning the component on the outer surface of the pressure vessel at the domed end portion; and
    winding a plurality of filament bands upon the domed end portion and across at least a part of the component to attach the component to the domed end portion.

17. The method of claim 16, wherein the component includes a plurality of radially extending tabs, wherein winding the plurality of filament bands includes winding at least one of the plurality of filament bands upon at least one of the plurality of tabs.

18. The method of claim 16, wherein the component includes an attachment feature, the method further including:
    coupling a protective cap to the component at the attachment feature.

* * * * *